(12) United States Patent
Kuwahara et al.

(10) Patent No.: US 9,382,953 B2
(45) Date of Patent: Jul. 5, 2016

(54) HYDRAULIC CONTROL CIRCUIT FOR DRIVE LINE

(71) Applicant: Toyota Jidosha Kabushiki Kaisha, Toyota-shi, Aichi-ken (JP)

(72) Inventors: Seiji Kuwahara, Toyota (JP); Toshio Sugimura, Nagoya (JP); Takahiko Tsutsumi, Nisshin (JP); Masato Yoshikawa, Toyota (JP); Koki Minamikawa, Nagoya (JP); Naoki Nakanishi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 70 days.

(21) Appl. No.: 14/546,390

(22) Filed: Nov. 18, 2014

(65) Prior Publication Data

US 2015/0136253 A1 May 21, 2015

(30) Foreign Application Priority Data

Nov. 19, 2013 (JP) ................................. 2013-239373
Oct. 24, 2014 (JP) ................................. 2014-217830

(51) Int. Cl.
 *F15B 13/043* (2006.01)
 *F16D 48/02* (2006.01)

(52) U.S. Cl.
 CPC ............. *F16D 25/14* (2013.01); *Y02T 10/6221* (2013.01); *Y10T 137/87169* (2015.04)

(58) Field of Classification Search
 CPC ... Y02T 10/6221; Y02T 10/623; F16D 25/14; Y10T 137/87169; Y10T 137/87917
 USPC ........ 137/596.15, 613; 475/116; 60/591, 405, 60/436, 494; 192/18 A, 12 C, 48.7, 56.3
 See application file for complete search history.

(56) References Cited

U.S. PATENT DOCUMENTS

| | | | | |
|---|---|---|---|---|
| 6,871,129 B2* | 3/2005 | Kitaori | ................... | B60K 6/543 475/125 |
| 7,018,315 B2* | 3/2006 | Endo | ........................ | B60K 6/48 475/120 |
| 8,308,595 B2* | 11/2012 | Noda | .................... | B60L 3/0023 475/116 |
| 8,857,188 B2* | 10/2014 | Noda | ....................... | B60K 6/48 123/179.25 |

(Continued)

FOREIGN PATENT DOCUMENTS

| | | |
|---|---|---|
| JP | 06-174079 A | 6/1994 |
| JP | 2009-035241 A | 2/2009 |
| JP | 2010-175038 A | 8/2010 |

*Primary Examiner* — Matthew W Jellett
*Assistant Examiner* — Minh Le
(74) *Attorney, Agent, or Firm* — Dinsmore & Shohl LLP

(57) ABSTRACT

A hydraulic control circuit for a drive line includes first and second switching valves and first and second solenoid valves. Each switching valve is alternatively switched by a switching hydraulic pressure to connect any two of three ports. The first port of the first switching valve is connected to a hydraulic actuator. The first port of the second switching valve is connected to the second port of the first switching valve. The first solenoid valve supplies the switching hydraulic pressure to the switching valves. The second solenoid valve regulates a control hydraulic pressure supplied to the hydraulic actuator. Any one of three oil paths is communicated with the hydraulic actuator by supplying the control hydraulic pressure via the third port of the first switching valve or the second or third port of the second switching valve and supplying the switching hydraulic pressure to at least one switching valve.

9 Claims, 16 Drawing Sheets

(56) References Cited

U.S. PATENT DOCUMENTS

| | | | |
|---|---|---|---|
| 9,079,583 B2* | 7/2015 | Miyazaki | B60K 6/48 |
| 9,108,635 B2* | 8/2015 | Miyazaki | B60K 6/48 |
| 9,284,882 B2* | 3/2016 | Kasuya | F02B 63/042 |
| 2006/0252593 A1* | 11/2006 | Inoue | F16H 61/0206 475/116 |
| 2009/0036269 A1 | 2/2009 | Kim | |
| 2010/0193315 A1 | 8/2010 | Shimizu et al. | |
| 2012/0217121 A1* | 8/2012 | Noda | B60K 6/48 192/113.3 |
| 2013/0213043 A1* | 8/2013 | Kasuya | F02B 63/04 60/700 |
| 2013/0284009 A1* | 10/2013 | Mitsui | F16H 61/14 91/41 |
| 2015/0260278 A1* | 9/2015 | Yamada | F16H 61/12 475/127 |

* cited by examiner

FIG. 4

| K0 CLUTCH PRESSURE | | SWITCHING HYDRAULIC PRESSURE Pon FOR ON-OFF SOLENOID VALVE | |
|---|---|---|---|
| | | WITHOUT OUTPUT | WITH OUTPUT |
| SLK0 PRESSURE | HIGH | SLK0 PRESSURE Pslk0 | EX |
| | LOW | | LINE PRESSURE PL |

FIG. 5

| K0 CLUTCH PRESSURE | | SWITCHING HYDRAULIC PRESSURE Pon FOR ON-OFF SOLENOID VALVE | |
|---|---|---|---|
| | | WITHOUT OUTPUT | WITH OUTPUT |
| SLK0 PRESSURE | HIGH | – | – |
| | LOW | SLK0 PRESSURE Pslk0 | LINE PRESSURE PL |

FIG. 14

| K0 CLUTCH PRESSURE | | SWITCHING HYDRAULIC PRESSURE Pon FOR ON-OFF SOLENOID VALVE | |
|---|---|---|---|
| | | WITHOUT OUTPUT | WITH OUTPUT |
| SLK0 PRESSURE | HIGH | EX | SLK0 PRESSURE Pslk0 |
| | LOW | LINE PRESSURE PL | |

F I G . 17

| K0 CLUTCH PRESSURE | | SWITCHING HYDRAULIC PRESSURE Pon FOR ON-OFF SOLENOID VALVE | |
|---|---|---|---|
| | | WITHOUT OUTPUT | WITH OUTPUT |
| SLK0 PRESSURE | HIGH | EX | SLK0 PRESSURE Pslk0 |
| | LOW | | LINE PRESSURE PL |

HYDRAULIC CONTROL CIRCUIT FOR DRIVE LINE

INCORPORATION BY REFERENCE

The disclosure of Japanese Patent Applications No. 2013-239373 and 2014-217830 filed on Nov. 19, 2013 and Oct. 24, 2014 including the specification, drawings and abstract is incorporated herein by reference in its entirety.

BACKGROUND OF THE INVENTION

1. Field of the Invention

The invention relates to a technique for setting three oil paths with the use of two switching valves.

2. Description of Related Art

There is well known a hydraulic control circuit that alternatively switches by a switching valve between an oil path that supplies hydraulic oil to a hydraulic actuator and an oil path that drains hydraulic oil from the hydraulic actuator. For example, a hydraulic control device for an automatic transmission, described in Japanese Patent Application Publication No. 6-174079 (JP 6-174079 A) is such a hydraulic control circuit. JP 6-174079 A describes the hydraulic control device including two oil paths that communicate with a clutch via a switching valve that is actuated by a solenoid valve. When supply of hydraulic pressure via one of the oil paths fails, the hydraulic control device switches the oil path communicating with the clutch to the other one of the oil paths by the switching valve.

SUMMARY OF THE INVENTION

Incidentally, if three oil paths communicating with the clutch are respectively assigned to, for example, supply of source pressure of hydraulic oil, supply of control pressure of hydraulic oil, and release of hydraulic oil to an atmosphere, it is conceivable to provide two switching valves for alternatively switching among the oil paths and two solenoid valves for independently actuating these switching valves. In this case, one of each of a switching valve and a solenoid valve is added to the configuration including the two oil paths communicating with the clutch, so there is an inconvenience that the size of the hydraulic control device increases.

The invention provides a hydraulic control circuit for a drive line, which is able to suppress an increase in the size of a device when three oil paths communicating with a hydraulic actuator are set with the use of two switching valves.

An aspect of the invention provides a hydraulic control circuit for a drive line. The hydraulic control circuit includes a first switching valve, a second switching valve, a first solenoid valve and a second solenoid valve. The first switching valve is configured to be alternatively switched by a switching hydraulic pressure so as to connect any two of a first port, a second port and a third port. The first port of the first switching valve is connected to a hydraulic actuator. The second switching valve is configured to be alternatively switched by the switching hydraulic pressure so as to connect any two of a first port, a second port and a third port. The first port of the second switching valve is connected to the second port of the first switching valve. The first solenoid valve is provided in common to the first switching valve and the second switching valve. The first solenoid valve is configured to supply the switching hydraulic pressure to the first switching valve and the second switching valve. The second solenoid valve is configured to regulate a hydraulic pressure as a control hydraulic pressure. The hydraulic pressure is supplied to the hydraulic actuator. Any one of three oil paths is communicated with the hydraulic actuator by supplying the control hydraulic pressure from the second solenoid valve to the hydraulic actuator via any one of the third port of the first switching valve, the second port of the second switching valve and the third port of the second switching valve and supplying the switching hydraulic pressure from the first solenoid valve to at least one of the first switching valve or the second switching valve.

With this configuration, the hydraulic control circuit according to the aspect of the invention is able to alternatively switch among the three oil paths communicating with the hydraulic actuator by providing the single solenoid valve that actuates the two switching valves when any one of the three oil paths communicating with the hydraulic actuator is set with the use of the two switching valves.

In the hydraulic control circuit according to the above aspect, the three oil paths may include a first oil path, a second oil path and a third oil path. When the predetermined switching hydraulic pressure is output and the control hydraulic pressure does not satisfy a predetermined condition, the first oil path may be set by communicating the first port and second port of the first switching valve, the first port and second port of the second switching valve and the hydraulic actuator with one another. When the predetermined switching hydraulic pressure is not output and the control hydraulic pressure does not satisfy the predetermined condition, the second oil path may be set by communicating the first port and third port of the first switching valve with the hydraulic actuator. When the predetermined switching hydraulic pressure is output and the control hydraulic pressure satisfies the predetermined condition, the third oil path may be set by communicating the first port and second port of the first switching valve, the first port and third port of the second switching valve and the hydraulic actuator with one another. With this configuration, it is possible to alternatively switch among the three oil paths by a combination of the switching hydraulic pressure common to the two switching valves with the predetermined condition of the control hydraulic pressure.

In the hydraulic control circuit according to the above aspect, the three oil paths may include a first oil path, a second oil path and a third oil path. When the predetermined switching hydraulic pressure is output and the control hydraulic pressure does not satisfy a predetermined condition, the first oil path may be set by communicating the first port and second port of the first switching valve, the first port and second port of the second switching valve and the hydraulic actuator with one another. When the predetermined switching hydraulic pressure is not output and the control hydraulic pressure does not satisfy the predetermined condition, the second oil path may be set by communicating the first port and third port of the first switching valve with the hydraulic actuator. When the predetermined switching hydraulic pressure is output and the control hydraulic pressure satisfies the predetermined condition, the third oil path may be set by communicating the first port and second port of the first switching valve, the first port and third port of the second switching valve and the hydraulic actuator with one another. With this configuration, it is possible to alternatively switch among the three oil paths by a combination of the switching hydraulic pressure common to the two switching valves with the predetermined condition of the control hydraulic pressure.

In the hydraulic control circuit according to the above aspect, the three oil paths may include an oil path that supplies a source pressure to hydraulic oil for actuating the hydraulic actuator, an oil path that supplies the control hydraulic pressure, and an oil path that communicates with a port exposed to an atmosphere. With this configuration, it is possible to alternatively communicate the oil paths having three different functions with the hydraulic actuator.

In the hydraulic control circuit according to the above aspect, the predetermined condition may be a condition that the control hydraulic pressure is higher than or equal to a predetermined value. With this configuration, when the control hydraulic pressure is higher than or equal to the predetermined value, it is possible to switch into the third oil path.

In the hydraulic control circuit according to the above aspect, the predetermined condition may be a condition that the control hydraulic pressure is lower than a predetermined value. With this configuration, when the control hydraulic pressure is lower than the predetermined value, it is possible to switch into the third oil path.

In the hydraulic control circuit according to the above aspect, a source pressure of the hydraulic oil may be input to the third port of the first switching valve, and an atmosphere exposure oil path may be connected to one of the second and third ports of the second switching valve, to which the control hydraulic pressure is not input. With this configuration, it is possible to alternatively switch among the oil path that supplies the source pressure, the oil path that supplies the control hydraulic pressure and the atmosphere exposure oil path. As a result, for example, when the second solenoid valve is in off-fail where the control hydraulic pressure is not output or only a low hydraulic pressure is output, the source pressure of hydraulic oil is supplied to the hydraulic actuator. For example, by communicating the hydraulic actuator with the atmosphere exposure oil path, hydraulic oil in the hydraulic actuator is more quickly drained than hydraulic oil in the hydraulic actuator is drained via the second solenoid valve, so the hydraulic pressure in the hydraulic actuator is quickly reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a table that shows an example of a K0 clutch pressure summarized for each condition;

FIG. 5 is a table that shows a K0 clutch pressure during off-fail of a solenoid valve, summarized for each condition;

FIG. 14 is a table that shows another example of the K0 clutch pressure summarized for each condition;

FIG. 17 is a table that shows another example of the K0 clutch pressure summarized for each condition.

DETAILED DESCRIPTION OF EMBODIMENTS

In an embodiment of the invention, suitably, a drive line is provided in a vehicle, and constitutes a power transmission path from a driving force source to a drive wheel. A hydraulic actuator is, for example, an actuator that constitutes part of a hydraulic engagement device that connects or interrupts the power transmission path. The hydraulic engagement device is, for example, a hydraulic clutch that connects or interrupts the power transmission path between an engine, which serves as the driving force source, and the drive wheel, that is, a hydraulic clutch that is able to disconnect the engine from the drive wheel. The engine is, for example, an internal combustion engine, such as a gasoline engine and a diesel engine, which generates power through combustion of fuel.

Suitably, the vehicle is a hybrid vehicle in which an electric motor that functions as a driving force source is provided in the power transmission path between the engine and the drive wheel. The hydraulic clutch connects or interrupts a power transmission path between the engine and the electric motor. The thus configured hybrid vehicle carries out engine running in which the hybrid vehicle travels by using at least the engine as the driving force source in a state where the clutch is engaged, and carries out motor running in which the hybrid vehicle travels by using only the electric motor as the driving force source in a state where the clutch is released. When the engine is started up during the motor running, the engine is cranked by the electric motor by controlling the clutch toward engagement.

Suitably, the vehicle includes a transmission that constitutes part of the power transmission path between the driving force source and the drive wheel. The transmission is a manual transmission, such as a known synchromesh parallel-two-shaft transmission including a plurality of pairs of constant-mesh transmission gears between the two shafts, various automatic transmissions (a planetary gear automatic transmission, a synchromesh parallel-two-shaft automatic transmission, a DCT, A continuously variable transmission, such as a belt-type continuously variable transmission, or the like), or the like. Each of the automatic transmissions is formed of an automatic transmission alone, an automatic transmission including a fluid transmission device, an automatic transmission including an auxiliary transmission, or the like.

Hereinafter, a first embodiment of the invention will be described in detail with reference to the accompanying drawings.

Figure 1:
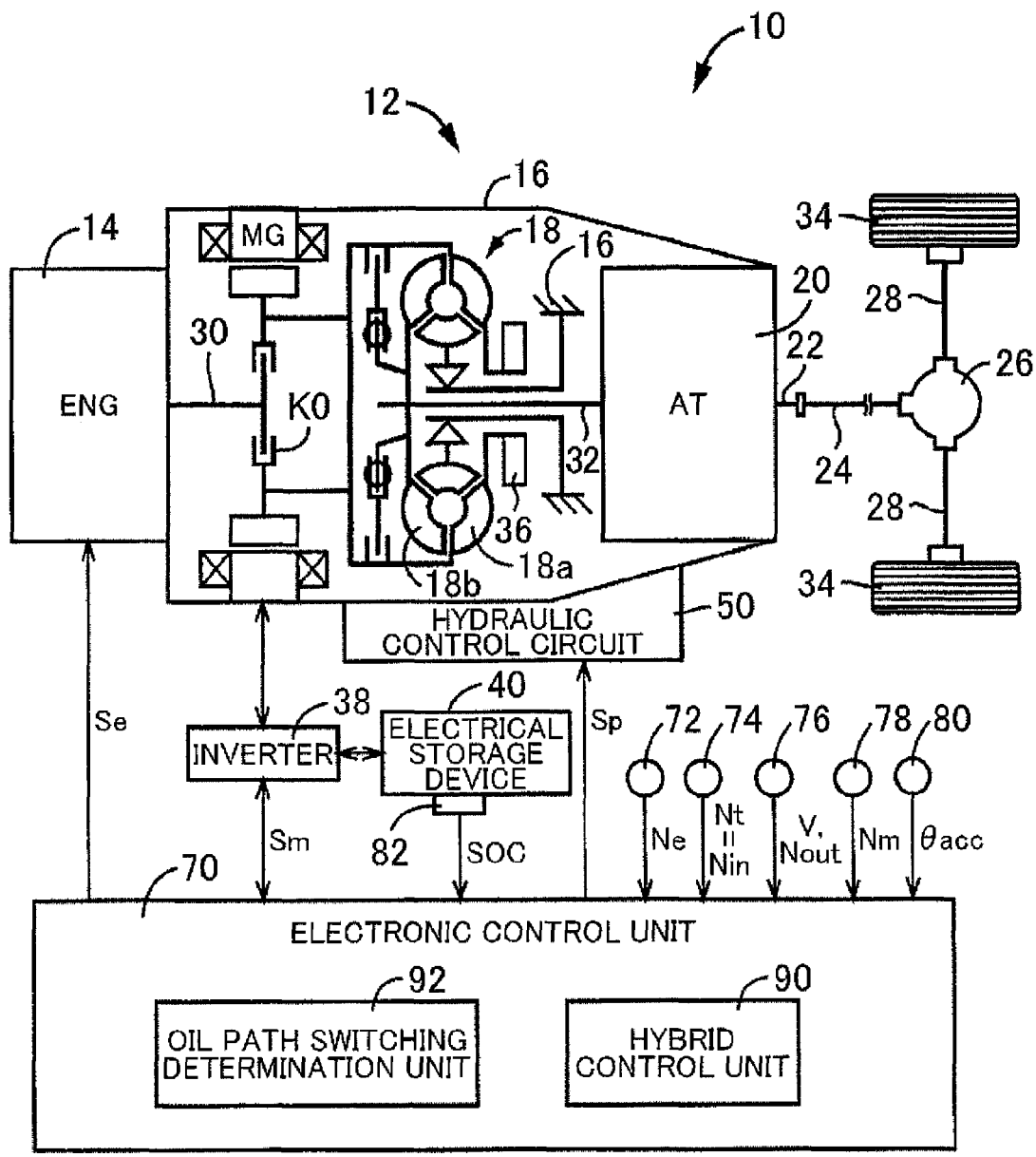
FIG. 1 is a view that illustrates the schematic configuration of a drive line provided in a vehicle to which the invention is applied, and is a view that illustrates a relevant portion of control functions and control system in the vehicle.

FIG. 1 is a view that illustrates the schematic configuration of a drive line 12 provided in a vehicle 10 to which the invention is applied and is a view that illustrates a relevant portion of control functions and control system for various controls in the vehicle 10. In FIG. 1, the vehicle 10 is a hybrid vehicle that includes an engine 14 and an electric motor MG as driving force sources. The drive line 12 includes an engine separating clutch K0 (hereinafter, referred to as clutch K0), a torque converter 18, an automatic transmission 20, and the like, in order from the engine 14 side inside a transmission case 16. The transmission case 16 serves as a non-rotating member. The drive line 12 includes a propeller shaft 24, a differential gear 26, a pair of axles 28, and the like. The propeller shaft 24 is coupled to a transmission output shaft 22 that is an output rotating member of the automatic transmission 20. The differential gear 26 is coupled to the propeller shaft 24. The pair of axles 28 are coupled to the differential gear 26. A pump impeller 18a of the torque converter 18 is coupled to an engine coupling shaft 30 via the clutch K0. The pump impeller 18a is directly coupled to the electric motor MG. A turbine impeller 18b of the torque converter 18 is directly coupled to a transmission input shaft 32 that is an input rotating member of the automatic transmission 20. The thus configured drive line 12 is, for example, suitably used in the FR vehicle 10. In the drive line 12, the power (which is synonymous with torque and force unless otherwise specifically distinguished from each other) of the engine 14 is transmitted from the engine coupling shaft 30 to a pair of drive wheels 34 sequentially via the clutch K0, the torque converter 18, the automatic transmission 20, the propeller shaft 24, the differential gear 26, the pair of axles 28, and the like, when the clutch K0 is engaged. The engine coupling shaft 30 couples the engine 14 to the clutch K0. In, this, way, the drive line 12 constitutes a power transmission path from the engine 14 to the drive wheels 34.

The vehicle 10, for example, includes a mechanical oil pump 36, an inverter 38, an electrical storage device 40, a hydraulic control circuit 50, and the like. The oil pump 36 is coupled to the pump impeller 18a. The inverter 38 controls the operation of the electric motor MG. The electrical storage device 40 exchanges electric power with the electric motor MG via the inverter 38. The hydraulic control circuit 50 controls shift operation of the automatic transmission 20, engagement/release operation of the clutch K0 and engagement/release operation of a known lockup clutch provided in the torque converter 18. The oil pump 36 generates the source pressure of hydraulic oil (that is, operating hydraulic pressure for carrying out shift control over the automatic transmission 20, engagement/release control over the clutch K0, engagement/release control over the lockup clutch, and the like) that is supplied to the hydraulic control circuit 50 by being rotationally driven by the engine 14 and/or the electric motor MG.

The electric motor MG is a so-called motor generator having the function of a motor that generates mechanical power from electric energy and the function of a generator that generates electric energy from mechanical energy. The electric motor MG generates driving power by using electric power (which is synonymous with electric energy unless otherwise specifically distinguished from each other) that is supplied from the electrical storage device 40 via the inverter 38 instead of the engine 14 or in addition to the engine 14. The electric motor MG converts the power of the engine. 14 or driven force, which is input from the drive wheels 34 side, to electric power through regeneration, and stores the electric power in the electrical storage device 40 via the inverter 38. The electric motor MG is provided in the power transmission path between the engine 14 and the drive wheels 34, and is coupled to a power transmission path between the clutch K0 and the torque converter 18. Power is transmitted to each other between the electric motor MG and the pump impeller 18a. In this way, the electric motor MG is coupled to the transmission input shaft 32 of the automatic transmission 20 such that power is transmittable without passing through the clutch K0.

The clutch K0 is, for example, a wet-type multi-disc hydraulic friction engagement device. The clutch K0 undergoes engagement/release control from the hydraulic control circuit 50 by using hydraulic pressure that is generated by the oil pump 36 as a source pressure. In the engagement/release control, a torque capacity (hereinafter, referred to as K0 torque) of the clutch K0 is changed by regulating a solenoid valve, or the like, in the hydraulic control circuit 50. In the engaged state of the clutch K0, the pump impeller 18a and the engine 14 are integrally rotated via the engine coupling shaft 30. On the other hand, in a released state of the clutch K0, transmission of power between the engine 14 and the pump impeller 18a is interrupted. That is, the engine 14 and the drive wheels 34 are disconnected from each other by releasing the clutch K0. Because the electric motor MG is coupled to the pump impeller 18a, the clutch K0 also functions as a clutch that is provided in the power transmission path between the engine 14 and the electric motor MG and that connects or interrupts the power transmission path, that is, a clutch that connects the engine 14 to the electric motor MG or disconnects the engine 14 from the electric motor MG.

Figure 2:
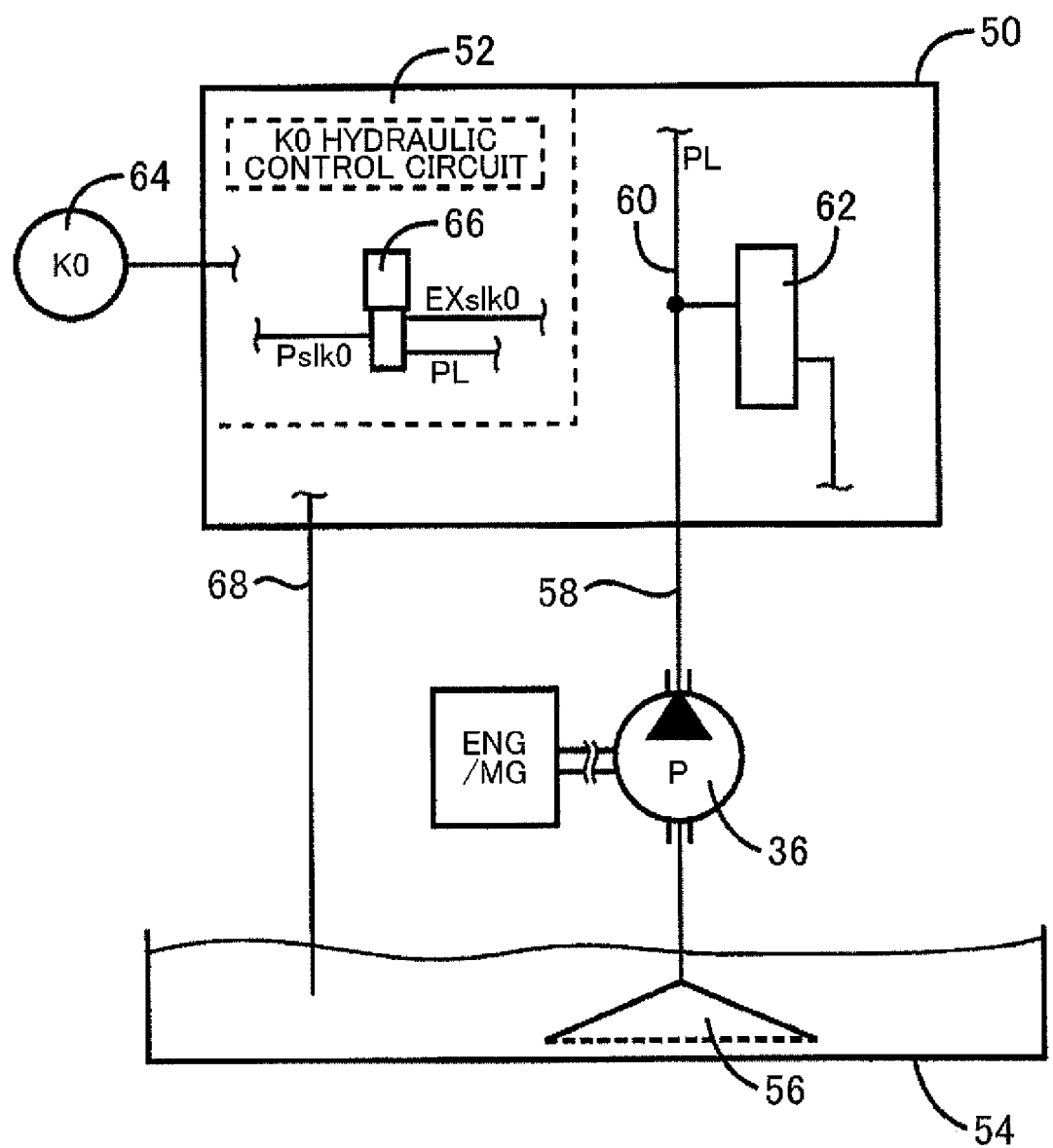
FIG. 2 is a view that illustrates the schematic configuration of a K0 hydraulic control circuit associated with actuation of a clutch within a hydraulic control circuit.

FIG. 2 is a view that illustrates the schematic configuration of the K0 hydraulic control circuit 52 associated with actuation of the clutch K0 within the hydraulic control circuit 50. In FIG. 2, the oil pump 36 draws hydraulic oil, returned to an oil pan 54, via a suction port (strainer) 56 and then discharges the hydraulic oil to a discharge oil path 58. The discharge oil path 58 is coupled to an oil path within the hydraulic control circuit 50 (for example, a line pressure oil path 60 through which a line pressure PL is applied). The hydraulic control circuit 50 includes a primary regulator valve 62. The primary regulator valve 62 regulates the line pressure PL by using the operating hydraulic pressure as a source pressure. The operating hydraulic pressure is output (generated) from the oil pump 36. The K0 hydraulic control circuit 52 that constitutes part of the hydraulic control circuit 50, for example, controls engagement/release operation of the clutch K0 by using the line pressure PL as a source pressure. In this way, the line pressure PL is the source pressure of hydraulic oil that is supplied to or drained from a hydraulic actuator 64. The hydraulic actuator 64 is formed of a clutch drum, a clutch piston, and the like, and is part of the clutch K0. The K0 hydraulic control circuit 52 includes a solenoid valve SLK0 (hereinafter, referred to as solenoid valve 66). The solenoid valve 66 outputs a control hydraulic pressure Pslk0 (hereinafter, referred to as SLK0 pressure Pslk0) by regulating the pressure of hydraulic oil that is supplied to the clutch K0. The thus configured K0 hydraulic control circuit 52 controls engagement/release operation of the clutch K0 by controlling supply or drain of hydraulic oil for actuation associated with the clutch K0 via the solenoid valve 66. Hydraulic oil, or the like, that is drained as a result of operation of the solenoid valve 66 is returned to the oil pan 54 via a drain oil path 68.

Referring back to FIG. 1, the vehicle 10 includes, for example, an electronic control unit 70. The electronic control unit 70 includes a controller for the vehicle 10 associated with actuation of the clutch K0, and the like. The electronic control unit 70 is, for example, configured to include a so-called microcomputer including a CPU, a RAM, a ROM, an input/output interface, and the like. The CPU executes various controls over the vehicle 10 by carrying out signal processing in accordance with a program prestored in the ROM while utilizing the temporary storage function of the RAM. For example, the electronic control unit 70 is configured to execute output control over the engine 14, drive control over the electric motor MG; including regenerative control over the electric motor MG, shift control over the automatic transmission 20, torque capacity control over the clutch K0, and the like. The electronic control unit 70 is formed separately in a unit for engine control, a unit for electric motor control, a unit for hydraulic pressure control, and the like, as needed. Various signals based on detected values of various sensors are supplied to the electronic control unit 70. The various sensors, for example, include various rotation speed sensors 72, 74, 76, 78, an accelerator operation amount sensor 80, a battery sensor, 82, and the like. The various signals, for example, include an engine rotation speed Ne, a turbine rotation speed Nt, that is, a transmission input shaft rotation speed Nin, a transmission output shaft rotation speed Nout corresponding to a vehicle speed V, an electric motor rotation speed (MG rotation speed) Nm, an accelerator, operation amount θacc that corresponds to a driver's drive request amount to, the vehicle 10, a state of charge (level of charge) SOC of the electrical storage device 40, and the like. For example, an engine output control command signal Se for output control over the engine 14, an electric motor control command signal Sm for controlling the operation of the electric motor MG, hydraulic pressure control command signals Sp for operating the solenoid valve 66, and the like, included in the hydraulic control circuit 50 for controlling the hydraulic actuator 64 of the clutch K0, the hydraulic actuator of the automatic transmission 20, the lockup clutch, and the like, are respectively output from the electronic control unit 70 to an engine control device, such as a throttle actuator and a fuel injection device, the inverter 38, the hydraulic control circuit 50, and the like.

The electronic control unit 70 includes hybrid control means, that is, a hybrid control unit 90, in order to implement control functions for various controls in the vehicle 10. The hybrid control unit 90 has the function of an engine drive control unit that executes drive control over the engine 14 and the function of an electric motor operation control unit that controls the operation of the electric motor MG as a driving force source or a generator via the inverter 38, and executes hybrid drive control, or the like, with the use of the engine 14 and the electric motor MG through those control functions. For example, the hybrid control unit 90 calculates a required driving torque Tdtgt as the driver's drive request amount for the vehicle 10 on the basis of the accelerator operation amount acc and the vehicle speed V. In consideration of a transmission loss, an auxiliary load, the speed ratio γ of the automatic transmission 20, the level of charge SOC of the electrical storage device 40, and the like, the hybrid control unit 90 outputs the command signals (the engine output control command signal Se and the electric motor control command signal Sm) for controlling the driving force sources so as to obtain the outputs of the driving force sources (the engine 14 and the electric motor MG), which achieve the required driving torque Tdtgt. Other than the required driving torque Tdtgt [Nm] of the drive wheels 34, the drive request amount may be a required driving force [N] of the drive wheels 34, a required driving power [W] of the drive wheels 34, a required transmission output torque of the transmission output shaft 22, or the like. The drive request amount may also be merely the accelerator operation amount θacc [%], a throttle valve opening degree [%], an intake air amount [g/sec], or the like.

Specifically, for example, when the required driving torque Tdtgt falls within the range in which the required driving torque Tdtgt can be provided by only the output of the electric motor MG, the hybrid control unit 90 sets a traveling mode to a motor running mode (hereinafter, EV mode), and carries out motor running (EV traveling) in which the vehicle travels by using only the electric motor MG as the driving force source in a state where the clutch K0 is released. On one hand, for example, when the required driving torque Tdtgt falls within the range in which the required driving torque Tdtgt cannot be provided unless at least the output of the engine 14 is used, the hybrid control unit 90 sets the traveling mode to an engine running mode, that is, a hybrid traveling mode (hereinafter, HV mode), and carries out engine running, that is, hybrid traveling (HV traveling) in which the vehicle travels by using at least the engine 14 as the driving force source in a state where the clutch K0 is engaged. On the other hand, for example, even when the required driving torque Tdtgt falls within the range in which the required driving torque Tdtgt can be provided by only the output of the electric motor MG, but when warm-up of the engine 14 or device associated with the engine 14 is required, the hybrid control unit 90 carries out HV traveling. In this way, the hybrid control unit 90 switches between EV traveling and HV traveling by automatically stopping the engine 14 during engine running or restarting the engine 14 after an engine stop on the basis of the required driving torque Tdtgt, or the like.

When the hybrid control unit 90 determines that there is an engine starting request as a result of, for example, an increase in the required driving torque Tdtgt during EV traveling, necessity of engine warm-up, or the like, the hybrid control unit 90 executes the series of operations associated with start-up of the engine 14. Specifically, when the hybrid control unit 90 determines that there is an engine starting request, the hybrid control unit 90 cranks the engine 14 with the use of the electric motor MG by controlling the released clutch K0 toward engagement. In addition, the hybrid control unit 90 starts up the engine 14 by starting supply of fuel, engine ignition, and the like (which is synonymous with a restart unless otherwise specifically distinguished from each other) in interlocking with cranking of the engine 14 with the use of the electric motor MG. Subsequently, when the hybrid control unit 90 determines that the engine 14 has carried out complete explosion (that is, the engine 14 enters a state where the engine 14 is autonomously rotatable), the hybrid control unit 90 controls the clutch K0, which has been controlled toward engagement, toward release once. That is, the hybrid control unit 90 increases the engine rotation speed Ne by controlling the clutch K0 toward engagement until the engine 14 carries out complete explosion, and, after the engine 14 has carried out complete explosion, the engine rotation speed Ne is increased through autonomous operation of the engine 14. For example, when the engine rotation speed Ne has increased to the MG rotation speed Nm through autonomous operation of the engine 14, the hybrid control unit 90 quickly completely engages the clutch K0. With such an engine starting method, because the clutch K0 is engaged in a state where the differential rotation of the clutch K0 itself is suppressed, an engagement shock is suppressed even when the clutch K0 is quickly engaged.

When the solenoid valve 66 is in off-fail where no SLK0 pressure Pslk0 that is the control hydraulic pressure Pslk0 of the solenoid valve 66 is output or only a hydraulic pressure lower than an SLK0 command pressure that is a command value to the solenoid valve 66 is output, there is a possibility that the vehicle 10 cannot carry out appropriate engine running in which the vehicle travels in a state where the clutch K0 is completely engaged and the vehicle 10 is allowed to carry out only EV traveling and, as a result, the travel distance of the vehicle 10 is limited. When the solenoid valve 66 is in off-fail, for example, it is conceivable to supply the line pressure PL to the clutch K0 and the vehicle 10 carries out engine running by completely engaging the clutch K0. Aside from this, in the above-described engine starting method, when the clutch K0, which has been controlled toward engagement, is temporarily controlled toward release, it is desirable that the clutch K0 be quickly released. For example, if the clutch K0 is released via the solenoid valve 66, responsiveness can be insufficient. Particularly, when a vibration damping accumulator, or the like, is provided, there is a possibility that responsiveness deteriorates. At the time of such release of the clutch K0, for example, it is conceivable that, by draining the hydraulic oil via an atmosphere exposure oil path EX, hydraulic oil in the hydraulic actuator 64 is more quickly drained than the hydraulic oil is drained via the solenoid valve 66. The atmosphere exposure oil path EX is able to drain hydraulic oil in a larger amount than a drain oil path EXslk0 of the solenoid valve 66.

Therefore, the hydraulic control circuit 50 according to the present, embodiment includes three oil paths as oil paths communicating with the hydraulic actuator 64. One of the oil paths supplies the SLK0 pressure Pslk0 to the hydraulic actuator 64. Another one of the oil paths supplies the line pressure PL to the hydraulic actuator 64. The other one of the oil paths connects the atmosphere exposure oil path EX to the hydraulic actuator 64 in order to drain hydraulic oil in the hydraulic actuator 64. The hydraulic control circuit 50 alternatively switches among those three oil paths. Generally, three oil paths are formed by providing two switching valves. Each of the switching valves is able to switch between two oil paths. Two on-off solenoid valves are respectively provided for the switching valves. Each of the on-off solenoid valves outputs hydraulic pressure for actuating a corresponding one of the switching valves. Thus, it is possible to alternatively switch among the three oil paths. In contrast, in the present embodiment, focusing on the fact that one of the three oil paths is an oil path that supplies the SLK0 pressure Pslk0, it is suggested that the two on-off solenoid valves be integrated into one. That is, when the three oil paths communicating with the hydraulic actuator 64 are set with the use of the two switching valves, the hydraulic control circuit 50 (K0 hydraulic control circuit 52) according to the present embodiment alternatively switches among the three oil paths including the oil path that supplies the SLK0 pressure Pslk0 only by providing a single on-off solenoid valve 104. Hereinafter, an example embodiment of the K0 hydraulic control circuit 52 will be described.

Figure 3:
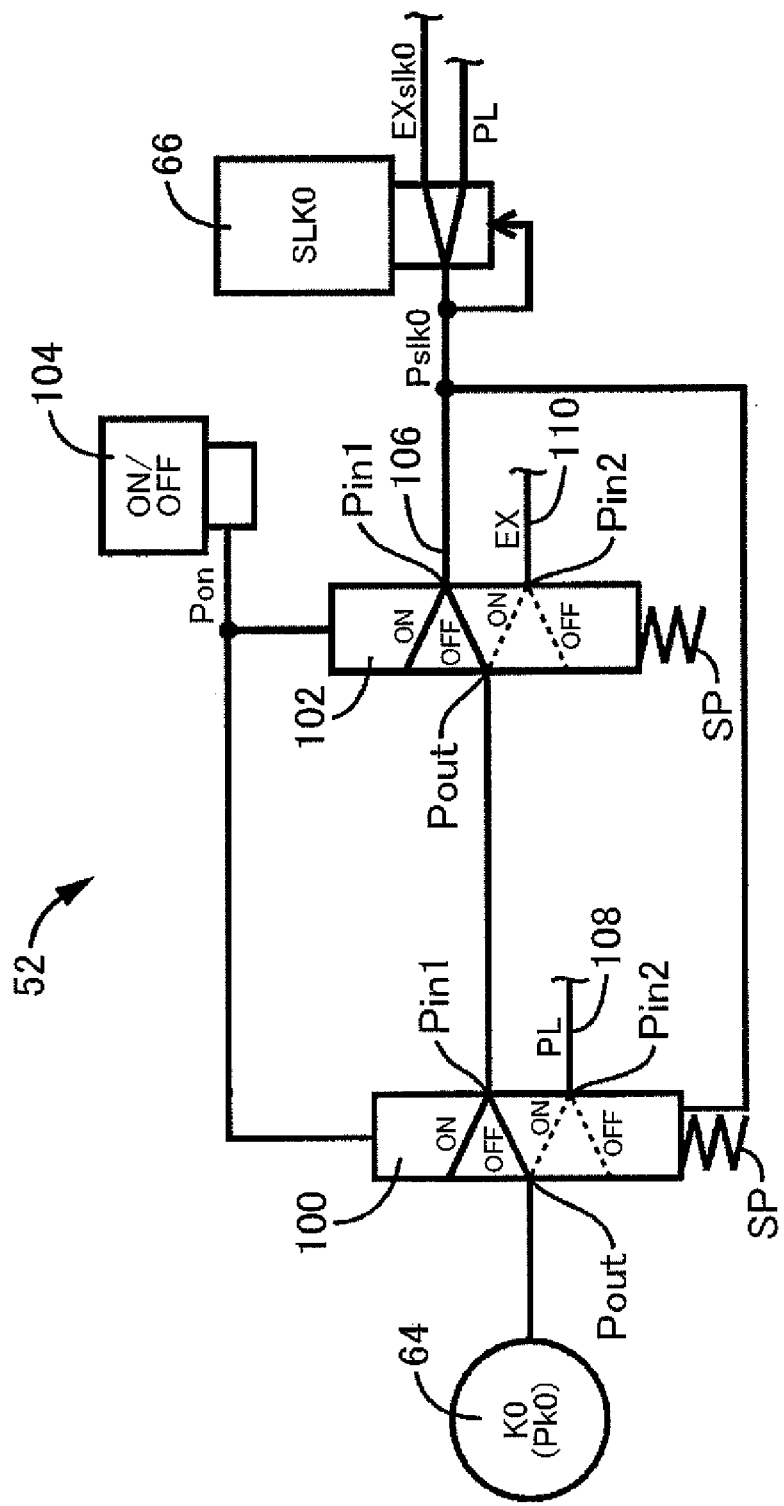
FIG. 3 is a view that shows an example embodiment of the K0 hydraulic control circuit.

FIG. 3 is a view that shows the example embodiment of the K0 hydraulic control circuit 52. In FIG. 3, the K0 hydraulic control circuit 52 further includes a first switching valve 100, a second switching valve 102 and the on-off solenoid valve 104 in addition to the solenoid valve 66 that outputs the SLK0 pressure Pslk0. The first switching valve 100 and the second switching valve 102 are valves having substantially the same configuration. Each of the first switching valve 100 and the second switching valve 102 includes a spring SP, a first input port Pin1, a second input port Pin2 and an output port Pout. The output port Pout alternatively communicates with the first input port Pin1 or the second input port Pin2. For example, each of the first switching valve 100 and the second switching valve 102 includes a spool valve element. In a valve body, the spool valve element is accommodated so as to be slidable by a predetermined sliding stroke and is urged in one direction by the spring SP. The spool valve element is formed of a well-known spool valve element that alternatively communicates the output port Pout with one or the other of the first input port Pin1 and the second input port Pin2 in accordance with movement of the spool valve element to one end or the other end of the sliding stroke.

The on-off solenoid valve 104 is a common on-off solenoid valve that outputs a switching hydraulic pressure Pon. The switching hydraulic pressure Pon is a predetermined switching hydraulic pressure for actuating the two switching valves 100, 102. The solenoid valve 66 is, for example, a normally-closed or NIC linear solenoid valve. The solenoid valve 66 is set in an open state in an excited state (on state) and outputs the SLK0 pressure Pslk0 that continuously changes with the command value (SLK0 command pressure), or the solenoid valve 66 is set in a closed state in a non-energized state (off state) and does not output hydraulic pressure. The on-off solenoid valve 104 is, for example, a normally-closed on-off solenoid valve. The on-off solenoid valve 104 outputs the switching hydraulic pressure Pon in an energized state according to an on command, or does not output the switching hydraulic pressure Pon in a non-energized state according to an off command. Each of the springs SP of the first and second switching valves 100, 102 generates urging force for switching a corresponding one of the first and second switching valves 100, 102 toward the off state to communicate the corresponding first input port Pin1 with the corresponding output port Pout. The switching hydraulic pressure Pon is applied to each of the first and second switching valves 100, 102 so that thrust is generated for switching each of the first and second switching valves 100, 102 against the urging force of the corresponding spring SP in an opposite direction to a direction in which thrust that is generated by the urging force of the corresponding spring SP acts. The switching hydraulic pressure Pon is a hydraulic pressure for switching each of the first and second switching valves 100, 102 toward an on state to communicate the corresponding second input port Pin2 with the corresponding output port Pout.

In the present embodiment, in the K0 hydraulic control circuit 52, the output port Pout of the first switching valve 100 is connected to the hydraulic actuator 64. In the present embodiment, the output port Pout of the second switching valve. 102 is connected to the first input port Pin1 of the first switching valve 100, and the SLK0 pressure Pslk0 is input to the first input port Pin1 of the second switching valve 102. In the present embodiment, the first port of the first switching valve is the output port Pout of the first switching valve 100, the second port of the first switching valve is the first input port Pin1 of the first switching valve 100, the third port of the first switching valve is the second input port Pin2 of the first switching valve 100, the first port of the second switching valve is the output port Pout of the second switching valve 102, and the second port or third port of the second switching valve is one of the first input port Pin1 and second input port Pin2 of the second switching valve 102. In the present embodiment, the first solenoid valve is the on-off solenoid valve 104, and the second solenoid valve is the solenoid valve 66. The SLK0 pressure Pslk0 is applied to the first switching valve 100 so that thrust is generated for switching the first switching valve 100 in an opposite direction (second direction) to a direction (first direction) of thrust that is generated by application of the switching hydraulic pressure Pon.

In the thus configured K0 hydraulic control circuit 52, when the SLK0 pressure Pslk0 does not satisfy a predetermined condition while no switching hydraulic pressure Pon is output, the first input port Pin1 is communicated with the output port Pout in each of the first and second switching valves 100, 102. Thus, a first oil path 106 is set. The first oil path 106 is an oil path that communicates the first input port Pin1 of the second switching valve 102, to which the SLK0 pressure Pslk0 is input, with the hydraulic actuator 64 sequentially via the output port Pout of the second switching valve 102, the first input port Pin1 of the first switching valve 100 and the output port Pout of the first switching valve 100, and is an oil path that supplies the SLK0 pressure Pslk0 to the hydraulic actuator 64 or releases the SLK0 pressure Pslk0 from the hydraulic actuator 64.

The predetermined condition is a condition that the SLK0 pressure Pslk0 is higher than or equal to a predetermined value. The predetermined value is a value that is set in the other switching valve (the first switching valve 100 in the present embodiment) on the basis of the urging force of the spring SP and the thrust caused by the switching hydraulic pressure Pon (=Pon×(Pressure receiving area of the spool valve element (not shown)). The predetermined value is a value of the SLK0 pressure Pslk0 (hereinafter, referred to as switching valve switching threshold) at a boundary at which communication of the output port Pout with the first input port Pin1 or the second input port Pin2 is switched depending on whether the thrust caused by the SLK0 pressure Pslk0 is large or small. In the first switching valve 100 according to the present embodiment, when no switching hydraulic pressure Pon is output, the first switching valve 100 is switched to the off state where the first input port Pin1 is communicated with the output port Pout depending on only the urging force of the corresponding spring SE. Therefore, when no switching hydraulic pressure Pon is output, the requirement that the SLK0 pressure Pslk0 does not satisfy the predetermined condition is not required. That is, in the K0 hydraulic control circuit 52 according to the present embodiment, when no switching hydraulic pressure Pon is output, the first input port Pin1 is communicated with the output port Pout in each of the first and second switching valves 100, 102 irrespective of the SLK0 pressure Pslk0. Thus, the first oil path 106 is set.

In the K0 hydraulic control circuit 52, when the SLK0 pressure Pslk0 does not satisfy the predetermined condition while the switching hydraulic pressure Pon is output (for example, when the SLK0 pressure Pslk0 is lower than the switching valve switching threshold), the second input port Pin2 is communicated with the output port Pout in each of the first and second switching valves 100, 102. Thus, a second oil path 108 is set. The second oil path 108 is an oil path that communicates the second input port Pin2 of the first switching valve 100 with the hydraulic actuator 64 via the output port Pout of the first switching valve 100. In the present embodiment, because the line pressure PL is input to the second input port Pin2 of the first switching valve 100, the second oil path 108 is an oil path that supplies the line pressure PL to the hydraulic actuator 64.

In the K0 hydraulic control circuit 52, the first input port Pin1 is communicated with the output port Pout in the first switching valve 100 when the SLK0 pressure Pslk0 is higher than or equal to the switching valve switching threshold irrespective of whether the switching hydraulic pressure Pon is output, and the second input port Pin2 is communicated with the output port Pout in the second switching valve 102 depending on the fact that the switching hydraulic pressure Pon is output. Thus, a third oil path 110 is set. The third oil path 110 is an oil path that communicates the second input port Pin2 of the second switching valve 102 with the hydraulic actuator 64 sequentially via the output port Pout of the second switching valve 102, the first input port Pin1 of the first switching valve 100 and the output port Pout of the first switching valve 100. In the present embodiment, because the atmosphere exposure oil path EX is connected to the second input port Pin2 of the second switching valve 102; which is one of the first and second input ports Pin1, Pin2 of the second switching valve 102, to which the SLK0 pressure Pslk0 is not input, the third oil path 110 is an oil path that connects the atmosphere exposure oil path EX to the hydraulic actuator 64.

FIG. 4 is a table that is a summary of the hydraulic pressure that is supplied to the clutch K0 (K0 clutch pressure Pk0) for each condition. As shown in FIG. 4, the K0 hydraulic control circuit 52 is able to set three types of supply pressure (K0 clutch pressure Pk0) with the use of the single on-off solenoid valve 104 by switching the first and second switching valves 100, 102 in accordance with whether the SLK0 pressure Pslk0 is high or low (for example, high or low with respect to the switching valve switching threshold). Specifically, when no switching hydraulic pressure Pon is output, the clutch K0 is controlled by the SLK0 pressure Pslk0. When the switching hydraulic pressure Pon is output, the oil path is switched in accordance with whether the SLK0 pressure Pslk0 is high or low. The oil path is connected to the atmosphere exposure oil path EX when the SLK0 pressure Pslk0 is high. The oil path is supplied with the line pressure PL when the SLK0 pressure Pslk0 is low. Thus, when the SLK0 pressure Pslk0 is low, it is possible to supply the line pressure PL by outputting the switching hydraulic pressure Pon. Because the SLK0 pressure Pslk0 is low when the solenoid valve 66 is in off-fail, when it is determined that the solenoid valve 66 is in off-fail, the line pressure PL is supplied when the switching hydraulic pressure Pon is output, as shown in FIG. 5. Thus, it is possible to engage the clutch K0 when the solenoid valve 66 is in off-fail, so it is possible to carry out engine running when the clutch K0 is engaged by outputting the switching hydraulic pressure Pon. When the SLK0 pressure Pslk0 is high, it is possible to connect the oil path to the atmosphere exposure oil path EX by outputting the switching hydraulic pressure Pon. When the SLK0 pressure Pslk0 is high because of a delay in response at the time of release of the clutch K0, it is possible to rapidly releasing the K0 clutch pressure Pk0 by connecting the oil path to the atmosphere exposure oil path EX. When the SLK0 pressure Pslk0 is high, the oil path is rapidly released through the atmosphere exposure oil path EX. When the SLK0 pressure Pslk0 is sufficiently low, it is less necessary to release the K0 clutch pressure Pk0 through the atmosphere exposure oil path EX. However, when the oil path is connected to the atmosphere exposure oil path EX, the output of the switching hydraulic pressure Pon needs to be stopped before the SLK0 pressure Pslk0 becomes lower than the switching valve switching threshold. This is because, if the SLK0 pressure Pslk0 becomes lower than the switching valve switching threshold in a state where the switching hydraulic pressure Pon is output, there is a concern that the oil path is switched to supply the line pressure PL and, as a result, the clutch K0 is engaged on the contrary.

Referring back to FIG. 1, the electronic control unit 70 further includes oil path switching determination means, that is, an oil path switching determination unit 92, in order to implement control functions for various controls in the vehicle 10. The oil path switching determination unit 92 determines whether to switch the oil path by, for example, determining whether the solenoid valve 66 is in off-fail. For example, in the case where the clutch K0 is not engaged when the SLK0 command pressure for engaging the clutch K0 is output by the hybrid control unit 90 and the differential rotation speed of the clutch K0 itself does not become zero or a value close to zero even with a lapse of a predetermined time, the oil path switching determination unit 92 determines that the SLK0 pressure Pslk0 according to the SLK0 command pressure is not output, and determines that the solenoid valve 66 is in off-fail. When the oil path switching determination unit 92 determines that the solenoid valve 66 is in off-fail, the hybrid control unit 90 switches the oil path communicating with the hydraulic actuator 64 from the oil path that supplies or releases the SLK0 pressure Pslk0 to the oil path that supplies the line pressure PL by outputting, to the on-off solenoid valve 104, a command to output the switching hydraulic pressure Pon.

The oil path switching determination unit 92 determines whether to switch the oil path by, for example, determining whether rapid release of the K0 clutch pressure Pk0 is required. For example, when the hybrid control unit 90 outputs the SLK0 command pressure for releasing the clutch K0 and, for example, when the release is a temporal release of the clutch K0 in process of engine start-up or when the oil temperature is low, the oil path switching determination unit 92 determines that rapid release of the K0 clutch pressure Pk0 is required. When the oil path switching determination unit 92 determines that rapid release of the K0 clutch pressure Pk0 is required, the hybrid control unit 90 switches the oil path communicating with the hydraulic actuator 64 from the oil path that supplies or releases the SLK0 pressure Pslk0 to the oil path that connects the atmosphere exposure oil path EX by outputting, to the on-off solenoid valve 104, the command to output the switching hydraulic pressure Pon.

The oil path switching determination unit 92 determines whether to switch the oil path by, for example, determining whether an actual pressure of the SLK0 pressure Pslk0 has decreased to an on-off solenoid valve switching control threshold. For example, when the hybrid control unit 90 outputs the SLK0 command pressure for releasing the clutch K0 and outputs, to the on-off solenoid valve 104, the command to output the switching hydraulic pressure Pon, and when a predetermined time has elapsed after the SLK0 command pressure is output, the oil path switching determination unit 92 determines that the actual pressure of the SLK0 pressure Pslk0 has decreased to the on-off solenoid valve switching control threshold. The on-off solenoid valve switching control threshold is a value obtained experimentally or by design in advance and stored (that is, a predetermined value) that is higher by a predetermined margin than the switching valve switching threshold in order to avoid a situation that the SLK0 pressure Pslk0 becomes lower than the switching valve switching threshold and the atmosphere exposure oil path EX is switched over to the oil path that supplies the line pressure PL. The predetermined time is, for example, a decrease determination time determined in advance as a time from the output, of the SLK0 command pressure for releasing the clutch K0 to when the actual pressure of the SLK0 pressure Pslk0 decreases to the on-off solenoid valve switching control threshold. The decrease determination time may be a constant value or may be a value that is changed on the basis of the magnitude of actual pressure of the SLK0 pressure Pslk0, the oil temperature, or the like, at the output start timing of the SLK0 command pressure. When the oil path switching determination unit 92 determines that the actual pressure of the SLK0 pressure Pslk0 has decreased to the on-off solenoid valve switching control threshold, the hybrid control unit 90 switches the oil path communicating with the hydraulic actuator 64 from the oil path that connects the atmosphere exposure oil path EX to the oil path that supplies or releases the SLK0 pressure Pslk0 by outputting, to the on-off solenoid valve 104, a command to stop the output of the switching hydraulic pressure Pon.

Figure 6:
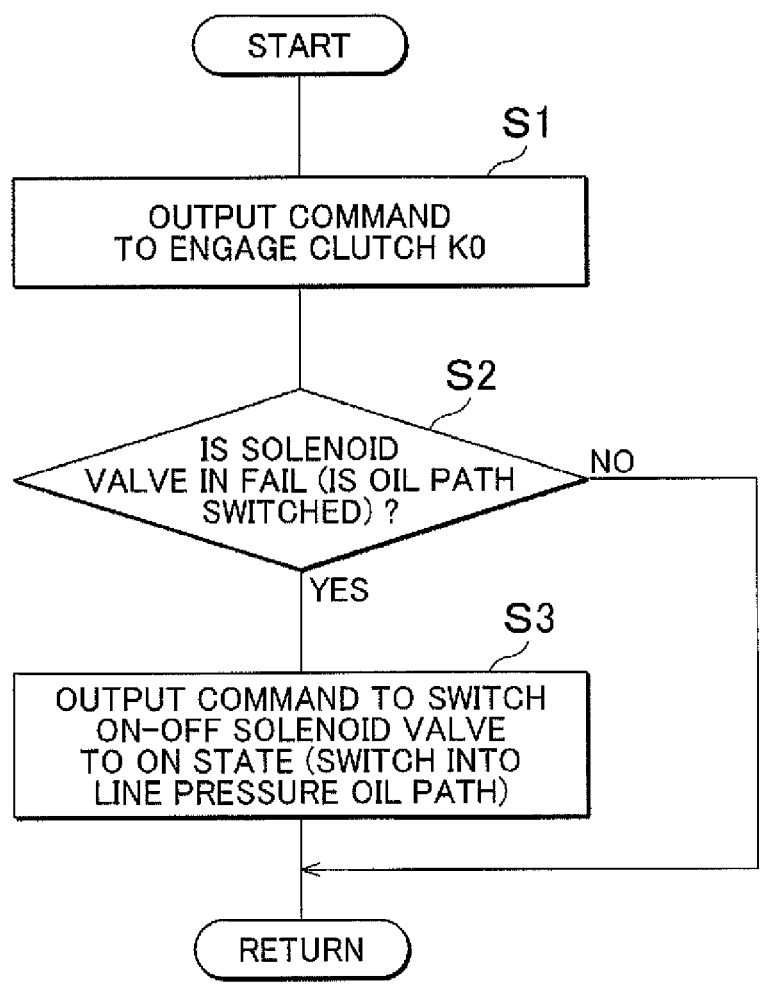
FIG. 6 is a flowchart that illustrates a relevant portion of control operations of an electronic control unit, that is, control operations for engaging the clutch during off-fail of the solenoid valve.
Figure 7:
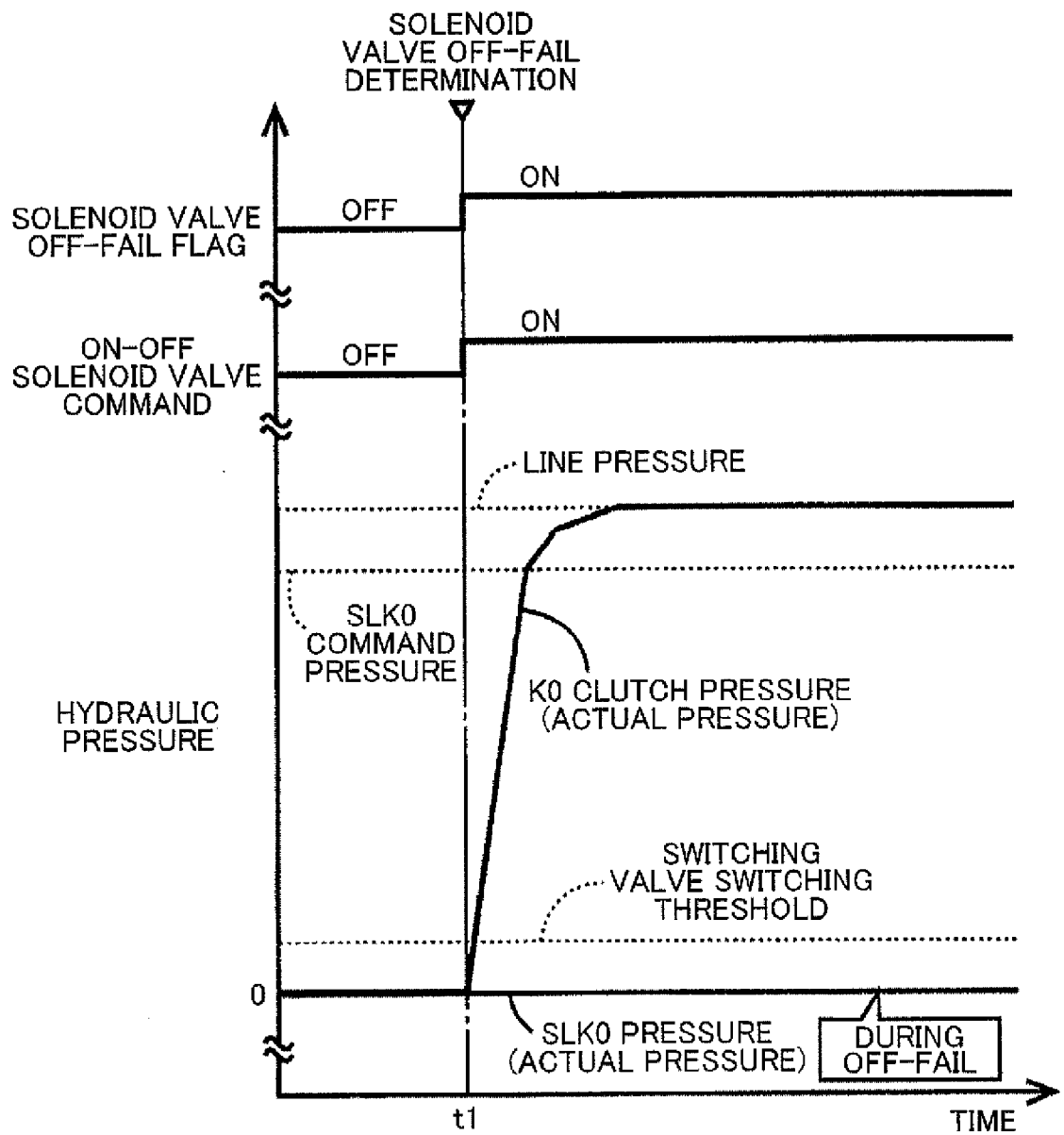
FIG. 7 is an example of a time chart in the case where the control operations shown in the flowchart of FIG. 6 are executed.

FIG. 6 is a flowchart that illustrates a relevant portion of control operations of the electronic control unit 70, that is, control operations for engaging the clutch K0 when the solenoid valve 66 is in off-fail. The flowchart is, for example, repeatedly executed at an extremely short cycle time of about several milliseconds to several tens of milliseconds. FIG. 7 is an example of a time chart in the case where the control operations shown in the flowchart of FIG. 6 are executed.

In FIG. 6, initially, in step (hereinafter, step is omitted) S1 corresponding to the hybrid control unit 90, for example, the SLK0 command pressure for engaging the clutch K0 is output. Subsequently, in S2 corresponding to the oil path switching determination unit 92, for example, it is determined whether the solenoid valve 66 is in off-fail. When negative determination is made in S2, the routine is ended. When affirmative determination is made in S2, for example, the command to output the switching hydraulic pressure Pon is output to the on-off solenoid valve 104 in S3 corresponding to the hybrid control unit 90. In combination with the fact that the SLK0 pressure Pslk0 is lower than the switching valve switching threshold because of off-fail of the solenoid valve 66, the oil path communicating with the hydraulic actuator 64 is switched from the oil path that supplies or releases the SLK0 pressure Pslk0 to the oil path that supplies the line pressure PL.

In FIG. 7, when the actual pressure of the SLK0 pressure Pslk0 does not increase although the SLK0 command pressure for engaging the clutch K0 is output, for example, it is determined on the basis of the differential rotation speed of the clutch K0 itself that the solenoid valve 66 is in off-fail, and an off-fail flag of the solenoid valve 66 is switched into an on state (t1 timing). The command to the on-off solenoid valve 104 is switched to the on state, and the switching hydraulic pressure Pon is output (after t1 timing). Thus, in combination with the fact that the actual pressure of the SLK0 pressure Pslk0 is lower than the switching valve switching threshold, the oil path that supplies the line pressure PL is communicated with the hydraulic actuator 64, and the clutch K0 is engaged.

Figure 8:
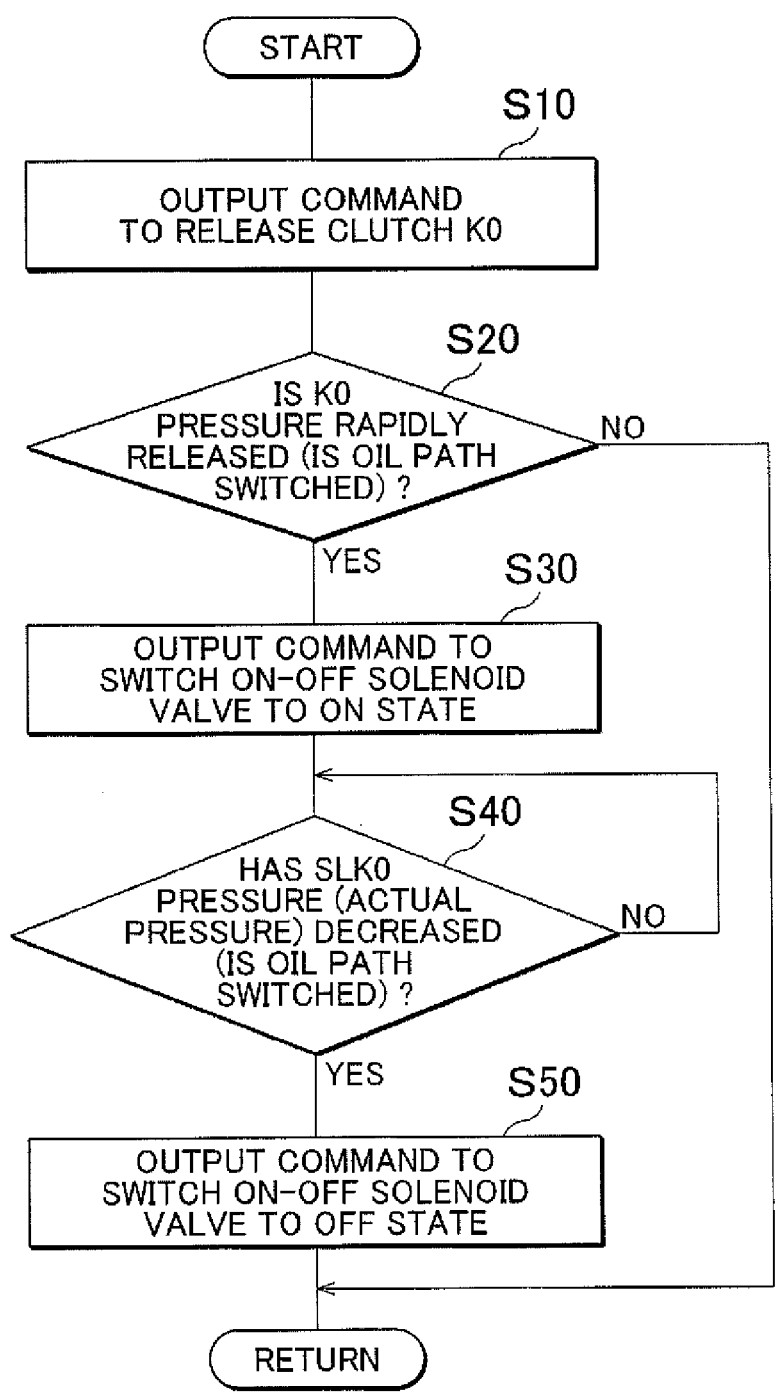
FIG. 8 is a flowchart that illustrates a relevant portion of control operations of the electronic control unit, that is, control operations for rapidly releasing the K0 clutch pressure.
Figure 9:
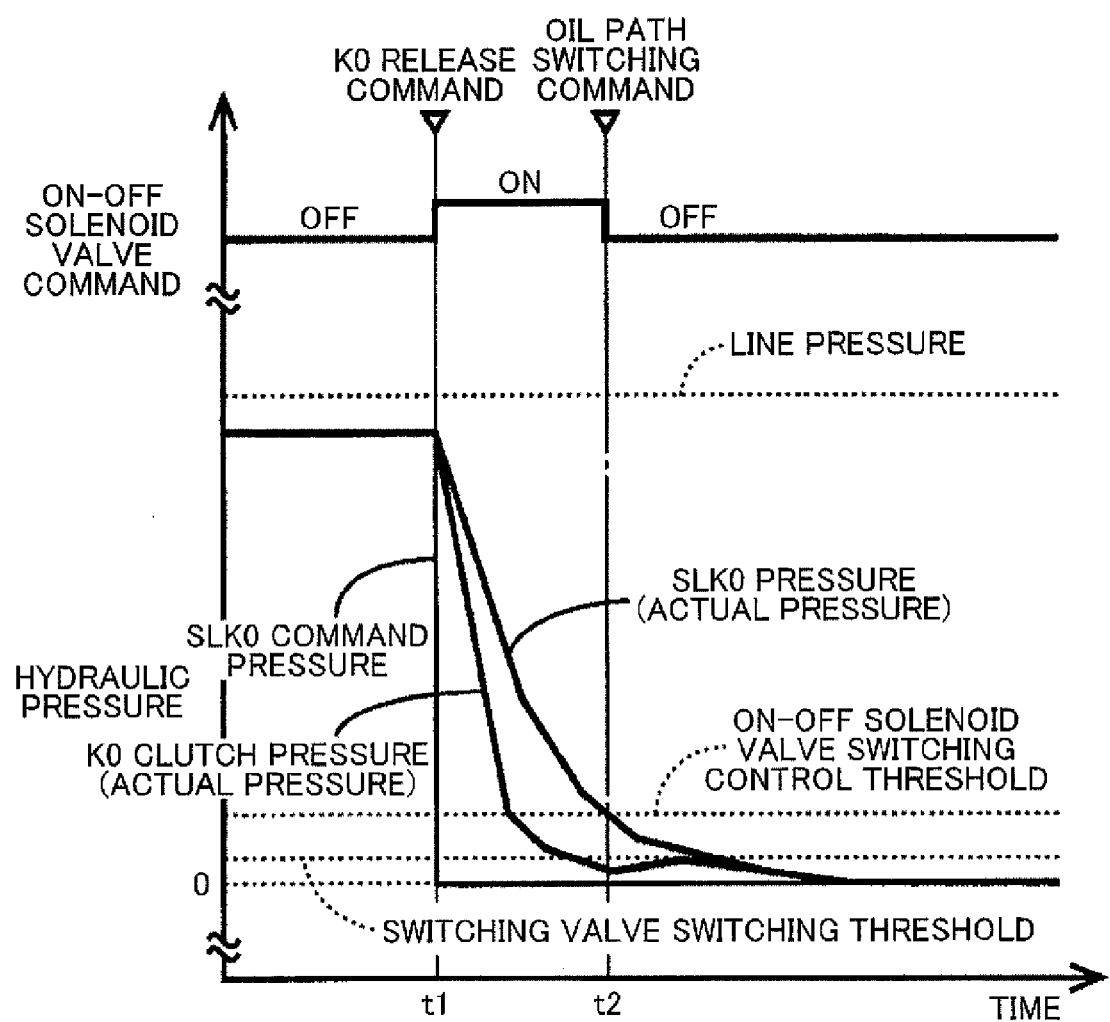
FIG. 9 is an example of a time chart in the case where the control operations shown in the flowchart of FIG. 8 are executed.

FIG. 8 is a flowchart that illustrates a relevant portion of control operations of the electronic control unit 70, that is, control operations for rapidly releasing the K0 clutch pressure Pk0. The flowchart is, for example, repeatedly executed at an extremely short cycle time of about several milliseconds to several tens of milliseconds. FIG. 9 is an example of a time chart in the case where the control operations shown in the flowchart of FIG. 8 are executed.

In FIG. 8, initially, in S10 corresponding to the hybrid control unit 90, for example, the SLK0 command pressure for releasing the clutch K0 is output. Subsequently, in S20 corresponding to the oil path switching determination unit 92, for example, it is determined whether rapid release of the K0 clutch pressure Pk0 is required. When negative determination is made in S20, the routine is ended. When affirmative determination is made in S20, for example, the command to output the switching hydraulic pressure Pon is output to the on-off solenoid valve 104 in S30 corresponding to the hybrid control unit 90. At the beginning of release of the clutch K0, in combination with the fact that the SLK0 pressure Pslk0 is higher than or equal to the switching valve switching threshold, the oil path communicating with the hydraulic actuator 64 is switched from the oil path that supplies or releases the SLK0 pressure Pslk0 to the oil path that connects the atmosphere exposure oil path EX. Subsequently, in S40 corresponding to the oil path switching determination unit 92, for example, it is determined whether the actual pressure of the SLK0 pressure Pslk0 has decreased to the on-off solenoid valve switching control threshold. When negative determination is made in S40, S40 is repeatedly executed. When affirmative determination is made in S40, for example, the command to stop the output of the switching hydraulic pressure Pon is output to the on-off solenoid valve 104 in S50 corresponding to the hybrid control unit 90. Thus, the oil path communicating with the hydraulic actuator 64 is switched from the oil path that connects the atmosphere exposure oil path EX to the oil path that supplies or releases the SLK0 pressure Pslk0.

In FIG. 9, the SLK0 command pressure for releasing the clutch K0 is output, the command to the on-off solenoid valve 104 is switched to the on state, and the switching hydraulic pressure Pon is output (t1 timing). Thus, in combination with the fact that the actual pressure of the SLK0 pressure Pslk0 is higher than or equal to the switching valve switching threshold, the hydraulic actuator 64 is communicated with the oil path that connects the atmosphere exposure oil path EX, and the K0 clutch pressure Pk0 is quickly decreased below the actual pressure of the SLK0 pressure Pslk0. Subsequently, when the actual pressure of the SLK0 pressure Pslk0 decreases to the on-off solenoid valve switching control threshold, the command to the on-off solenoid valve 104 is switched to the off state where the first input port Pin1 is communicated with the output port Pout, and the output of the switching hydraulic pressure Pon is stopped (t2 timing). Thus, the oil path that supplies or releases the SLK0 pressure Pslk0 is communicated with the hydraulic actuator 64, and a situation that the oil path that supplies the line pressure PL is communicated with the hydraulic actuator 64 as a result of the fact that the actual pressure of the SLK0 pressure Pslk0 becomes lower than the switching valve switching threshold is avoided. The oil path that supplies or releases the SLK0 pressure Pslk0 is communicated with the hydraulic actuator 64, so the K0 clutch pressure Pk0 increases toward the actual pressure of the SLK0 pressure Pslk0. However, at this timing, the SLK0 pressure Pslk0 has been already sufficiently decreased, so influence on quick release of the clutch K0 is small.

As described above, according to the present embodiment, when the hydraulic control circuit 50 (K0 hydraulic control circuit 52) sets the three oil paths communicating with the hydraulic actuator 64 with the use of the first and second switching valves 100, 102, the hydraulic control circuit 50 is able to alternatively switch among the three oil paths communicating with the hydraulic actuator 64, including the oil path that supplies the control hydraulic pressure Pslk0 of the solenoid valve 66, by providing only the single on-off solenoid valve 104 that actuates the first and second switching valves 100, 102.

According to the present embodiment, by combining the magnitude of thrust that is caused by the switching hydraulic pressure Pon of the on-off solenoid valve 104 and applied to the two switching valves, the magnitude of thrust caused by a pressure other than the switching hydraulic pressure Pon, and the directions of these thrust forces, it is possible to alternatively switch among the three oil paths communicating with the hydraulic actuator 64 by providing only the single on-off solenoid valve 104 common to the two switching valves.

According to the present embodiment, it is possible to alternatively switch among the three oil paths with the use of a combination of the switching hydraulic pressure Pon of the single on-off solenoid valve 104 common to the two switching valves with the predetermined condition of the control hydraulic pressure Pslk0 of the solenoid valve 66.

According to the present embodiment, when the predetermined switching hydraulic pressure Pon is output, the control hydraulic pressure Pslk0 of the solenoid valve 66 is higher than or equal to the predetermined value and the control hydraulic pressure Pslk0 of the solenoid valve 66 is applied in the second direction to switch the second switching valve 102, the first input port Pin1 of the first switching valve 100 is communicated with the output port Pout of the second switching valve 102 and the second input port Pin2 of the second switching valve 102 is communicated with the output port Pout of the second switching valve 102. Thus, the third oil path 110 is set. As a result, it is possible to alternatively switch among the three oil paths with the use of the single on-off solenoid valve 104 common to the two switching valves.

According to the present embodiment, when the solenoid valve 66 is in off-fail, the line pressure PL is supplied to the hydraulic actuator 64. By communicating the hydraulic actuator 64 with the atmosphere exposure oil path EX, hydraulic oil in the hydraulic actuator 64 is more quickly drained than the hydraulic oil in the hydraulic actuator 64 is drained via the solenoid valve 66. That is, the hydraulic pressure in the hydraulic actuator 64 is quickly reduced.

Next, other embodiments of the invention will be described. In the following description, like reference numerals denote portions common to embodiments, and the description thereof is omitted.

Figure 10:
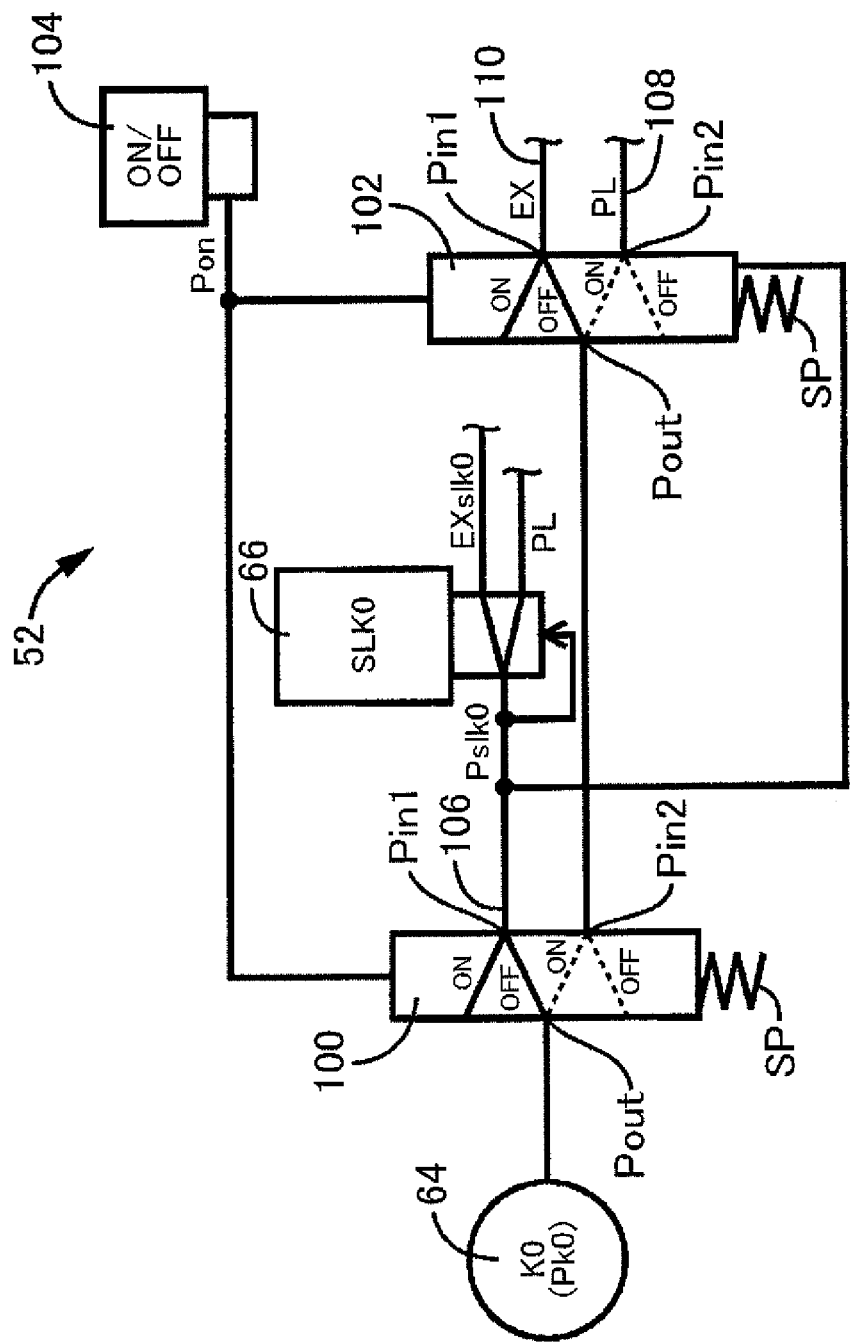
FIG. 10 is a view that shows another example embodiment of the K0 hydraulic control circuit.

A second embodiment of the invention will be described. FIG. 10 is a view that shows another example embodiment of the K0 hydraulic control circuit 52, and is an embodiment different from that of FIG. 3. Hereinafter, portions different from the embodiment of FIG. 3 will be mainly described.

In FIG. 10, in the K0 hydraulic control circuit 52 according to the present embodiment, the output port Pout of the second switching valve 102 is connected to the second input port Pin2 of the first switching valve 100. In the present embodiment, the SLK0 pressure Pslk0 is input to the first input port Pin1 of the first switching valve 100. In the present embodiment, the first port of the first switching valve is the output port Pout of the first switching valve 100, the second port of the first switching valve is the second input port Pin2 of the first switching valve 100, the third port of the first switching valve is the first input port Pin1 of the first switching valve 100, the first port of the second switching valve is the output port Pout of the second switching valve 102, and the second port or third port of the second switching valve is one of the first input port Pin1 and second input port Pin2 of the second switching valve 102. In the present embodiment, the first solenoid valve is the on-off solenoid valve 104, and the second solenoid valve is the solenoid valve 66. In the present embodiment, the SLK0 pressure Pslk0 is applied to the second switching valve 102 so that thrust is generated for switching the second switching valve 102 in the opposite direction (second direction) to the direction (first direction) of thrust that is generated by application of the switching hydraulic pressure Pon.

In the thus configured K0 hydraulic control circuit 52 according to the present embodiment, when the SLK0 pressure Pslk0 does not satisfy the condition that the SLK0 pressure Pslk0 is higher than or equal to the predetermined value while no, switching hydraulic pressure Pon is output, the first input port Pin1 is communicated with the output port Pout in each of the first and second switching valves 100, 102. Thus, the first oil path 106 is set. The first oil path 106 is an oil path that communicates the first input port Pin1 of the first switching valve 100, to which the SLK0 pressure Pslk0 is input, with the hydraulic actuator 64 via the output port Pout of the first switching valve 100, and is an oil path that supplies the SLK0 pressure Pslk0 to the hydraulic actuator 64 or releases the SLK0 pressure Pslk0 from the hydraulic actuator 64. In the second switching valve 102 according to the present embodiment, when no switching hydraulic pressure Pon is output, the second switching valve 102 is switched to the off state where the first input port Pin1 is communicated with the output port Pout depending on only the urging force of the corresponding spring SP. Therefore, when no switching hydraulic pressure Pon is output, the requirement that the condition that the SLK0 pressure Pslk0 is higher than or equal to the predetermined pressure is not satisfied is not required. That is, in the K0 hydraulic control circuit 52 according to the present embodiment, when no switching hydraulic pressure Pon is output, the first input port Pin1 is communicated with the output port Pout in each of the first and second switching valves 100, 102 irrespective of the SLK0 pressure Pslk0. Thus, the first oil path 106 is set.

In the K0 hydraulic control circuit 52 according to the present embodiment, when the SLK0 pressure Pslk0 is lower than the switching valve switching threshold while the switching hydraulic pressure Pon is output, the second input port Pin2 is communicated with the output port Pout in each of the first and second switching valves 100, 102. Thus, the second oil path 108 is set. The second oil path 108 is an oil path that communicates the second input port Pin2 of the second switching valve 102 with the hydraulic actuator 64 sequentially via the output port Pout of the second switching valve 102, the second input port Pin2 of the first switching valve 100 and the output port Pout of the first switching valve 100. In the present embodiment, because the line pressure PL is input to the second input port Pin2 of the second switching valve 102, the second oil path 108 is an oil path that supplies the line pressure PL to the hydraulic actuator 64.

In the K0 hydraulic control circuit, 52 according to the present embodiment, the first input port Pin1 is communicated with the output port Pout in the second switching valve 102 when the SLK0 pressure Pslk0 is higher than or equal to the switching valve switching threshold irrespective of whether the switching hydraulic pressure Pon is output, and the second input port Pin2 is communicated with the output port Pout in the first switching valve 100 depending on the fact that the switching hydraulic pressure Pon is output. Thus, the third oil path 110 is set. The third oil path 110 is an oil path that communicates the first input port Pin1 of the second switching valve 102 with the hydraulic actuator 64 sequentially via the output port Pout of the second switching valve 102, the second input port Pin2 of the first switching valve 100 and the output port Pout of the first switching valve 100. In the present embodiment, because the atmosphere exposure oil path EX is connected to the first input port Pin1 of the second switching valve 102, the third oil path 110 is an oil path that connects the atmosphere exposure oil path EX to the hydraulic actuator 64.

As described above, according to the present embodiment, as shown in FIG. 4, the hydraulic control circuit 50 (K0 hydraulic control circuit 52) is able to set three types of supply pressure (K0 clutch pressure Pk0) with the use of the single on-off solenoid valve 104 by switching the first and second switching valves 100, 102 in accordance with whether the SLK0 pressure Pslk0 is high or low (for example, high or low with respect to the switching valve switching threshold). Thus, similar advantageous effects to those of the above-described first embodiment are obtained.

According to the present embodiment, when the predetermined switching hydraulic pressure Pon is output, the control hydraulic pressure Pslk0 of the solenoid valve 66 is higher than or equal to the predetermined switching valve switching threshold and the control hydraulic pressure Pslk0 of the solenoid valve 66 is applied in the second direction to switch the second switching valve 102, the second input port Pin2 of the first switching valve 100 is communicated with the output port Pout of the second switching valve 102, and the first input port Pin1 of the second switching valve 102 is communicated with the output port Pout of the second switching valve 102. Thus, the third oil path 110 is set. As a result, it is possible to alternatively switch among the three oil, paths with the use of, the single on-off solenoid valve 104 common to the two switching valves.

Figure 11:
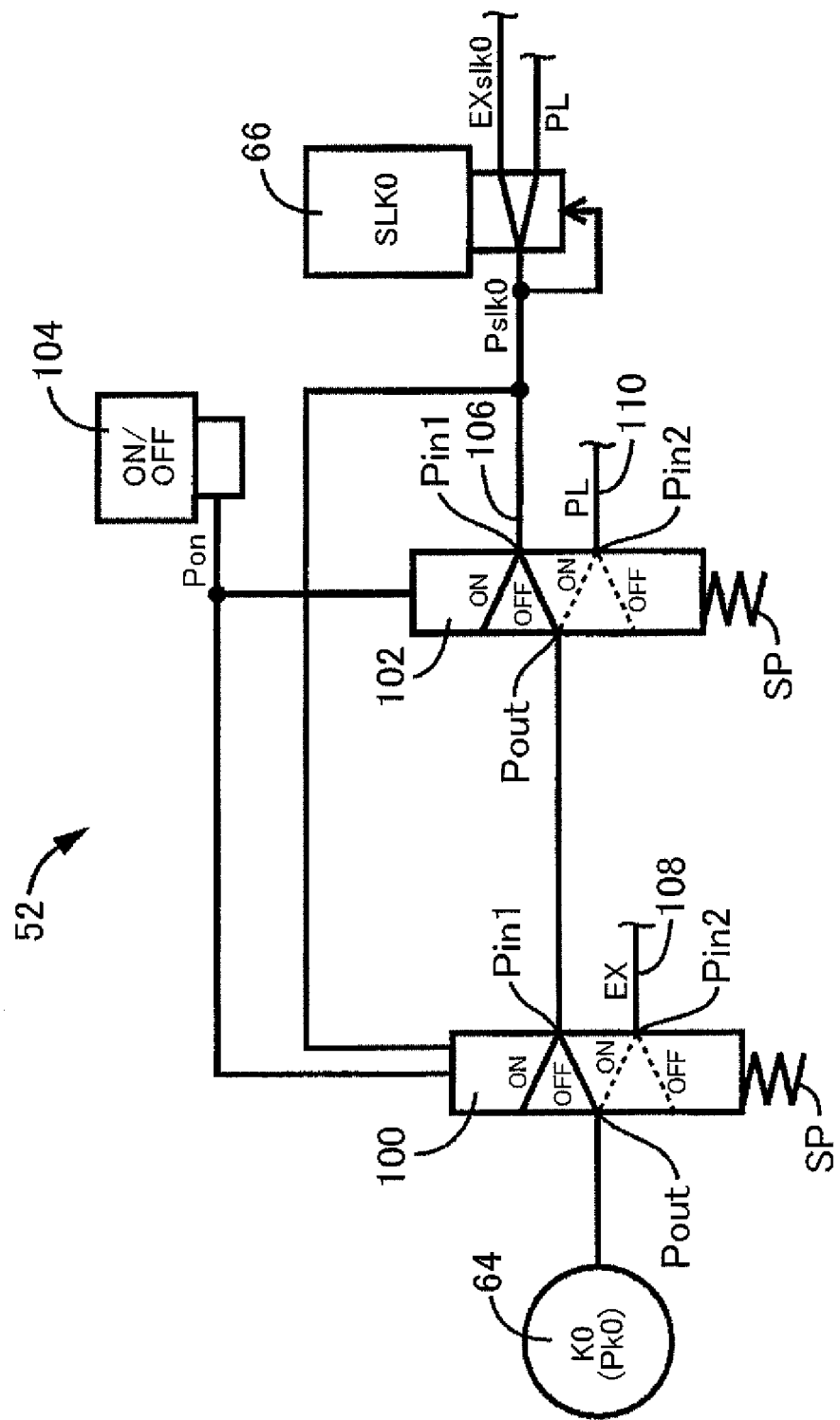
FIG. 11 is a view that shows another example embodiment of the K0 hydraulic control circuit.

A third embodiment of the invention will be described. FIG. 11 is a view that shows another example embodiment of the K0 hydraulic control circuit 52, and is an embodiment different from that of FIG. 3. Hereinafter, portions different from the embodiment of FIG. 3 will be mainly described.

In FIG. 11, in the K0 hydraulic control circuit 52 according to the present embodiment, the output port Pout of the second switching valve 102 is connected to the first input port Pin1 of the first switching valve 100. In the present embodiment, the SLK0 pressure Pslk0 is input to the first input port Pin1 of the second switching valve 102. In the present embodiment, the first port of the first switching valve is the output port Pout of the first switching valve 100, the second port of the first switching valve is the first input port Pin1 of the first switching valve 100, the third port of the first switching valve is the second input port Pin2 of the first switching valve 100, the first port of the second switching valve is the output port Pout of the second switching valve 102, and the second port or third port of the second switching valve is one of the first input port Pin1 and second input port Pin2 of the second switching valve 102. In the present embodiment, the first solenoid valve is the on-off solenoid valve 104, and the second solenoid valve is the solenoid valve 66. The SLK0 pressure Pslk0 is applied to the other switching valve so that thrust is generated for switching the other switching valve in the same direction (first direction) as the direction (first direction) of thrust that is generated by application of the switching hydraulic pressure Pon. In the present embodiment, the SLK0 pressure Pslk0 is applied to the first switching valve 100 so that thrust is generated for switching the first switching valve 100 in the same direction (first direction) as the direction (first direction) of thrust that is generated by application of the switching hydraulic pressure Pon.

In the thus configured K0 hydraulic control circuit 52, when the SLK0 pressure Pslk0 does not satisfy a predetermined condition while no switching hydraulic pressure Pon is output, the first input port Pin1 is communicated with the output port Pout in each of the first and second switching valves 100, 102. Thus, the first oil path 106 is set. The first oil path 106 is an oil path that communicates the first input port Pin1 of the second switching valve 102, to which the SLK0 pressure Pslk0 is input, with the hydraulic actuator 64 sequentially via the output port Pout of the second switching valve 102, the first input port Pin1 of the first switching valve 100 and the output port Pout of the first switching valve 100, and is an oil path that supplies the SLK0 pressure Pslk0 to the hydraulic actuator 64 or releases the SLK0 pressure Pslk0 from the hydraulic actuator 64.

The predetermined condition is a condition that the SLK0 pressure Pslk0 is lower than the predetermined value. When the switching hydraulic pressure Pon is output and the SLK0 pressure Pslk0 is higher than or equal to the predetermined value, the first switching valve 100 according to the present embodiment is switched to the on state where the second input port Pin2 is communicated with the output port Pout. Therefore, in the first switching valve 100 according to the present embodiment, when no switching hydraulic pressure Pon is output, the first switching valve 100 is switched to the off state where the first input port Pin1 is communicated with the output port Pout. Therefore, when no switching hydraulic pressure Pon is output, the requirement that the SLK0 pressure Pslk0 does not satisfy the predetermined condition is not required. That is, in the K0 hydraulic control circuit 52 according to the present embodiment, when no switching hydraulic pressure Pon is output, the first input port Pin1 is communicated with the output port Pout in each of the first and second switching valves 100, 102 irrespective of the SLK0 pressure Pslk0. Thus, the first oil path 106 is set.

In the K0 hydraulic control circuit 52, when the SLK0 pressure Pslk0 does not satisfy the predetermined condition while the switching hydraulic pressure Pon is output (for example, when the SLK0 pressure Pslk0 is higher than or equal to the switching valve switching threshold), the second input port Pin2 is communicated with the output port Pout in each of the first and second switching valves 100, 102. Thus, the second oil path 108 is set. The second oil path 108 is an oil path that communicates the second input port Pin2 of the first switching valve 100 with the hydraulic actuator 64 via the output port Pout of the first switching valve 100. In the present embodiment, because the atmosphere exposure oil path EX is connected to the second input port Pin2 of the first switching valve 100, the second oil path 108 is an oil path that connects the atmosphere exposure oil path EX to the hydraulic actuator 64.

In the K0 hydraulic control circuit 52 according to the present embodiment, the first input port Pin1 is communicated with the output port Pout in the first switching valve 100 when the SLK0 pressure Pslk0 is lower than the switching valve switching threshold irrespective of whether the switching hydraulic pressure Pon is output, and the second input port Pin2 is communicated with the output port Pout in the second switching valve 102 depending on the fact that the switching hydraulic pressure Pon is output. Thus, the third oil path 110 is set. The third oil path 110 is an oil path that communicates the second input port Pin2 of the second switching valve 102 with the hydraulic actuator 64 sequentially via the output port Pout of the second switching valve 102, the first input port Pin1 of the first switching valve 100 and the output port Pout of the first switching valve 100. In the present embodiment, because the line pressure PL is input to the second input port Pin2 of the second switching valve 102, the third oil path 110 is an oil path that supplies the line pressure PL to the hydraulic actuator 64.

As described above, according to the present embodiment, as shown in FIG. 4, the hydraulic control circuit 50 (K0 hydraulic control circuit 52) is able to set three types of supply pressure (K0 clutch pressure Pk0) with the use of the single on-off solenoid valve 104 by switching the first and second switching valves 100, 102 in accordance with whether the SLK0 pressure Pslk0 is high or low (for example, high or low with respect to the switching valve switching threshold). Thus, similar advantageous effects to those of the above-described first embodiment are obtained.

According to the present embodiment, when the switching hydraulic pressure Pon is output, the control hydraulic pressure Pslk0 of the solenoid valve 66 is lower than the predetermined switching valve switching threshold and the control hydraulic pressure Pslk0 of the solenoid valve 66 is applied in the first direction to switch the first switching valve 100, the first input port Pin1 of the first switching valve 100 is communicated with the output port Pout of the second switching valve 102, and the second input port Pin2 of the second switching valve 102 is communicated with the output port Pout of the second switching valve 102. Thus, the third oil path 110 is set. As a result, it is possible to alternatively switch among the three oil paths with the use of the single on-off solenoid valve 104 common to the two switching valves.

Figure 12:
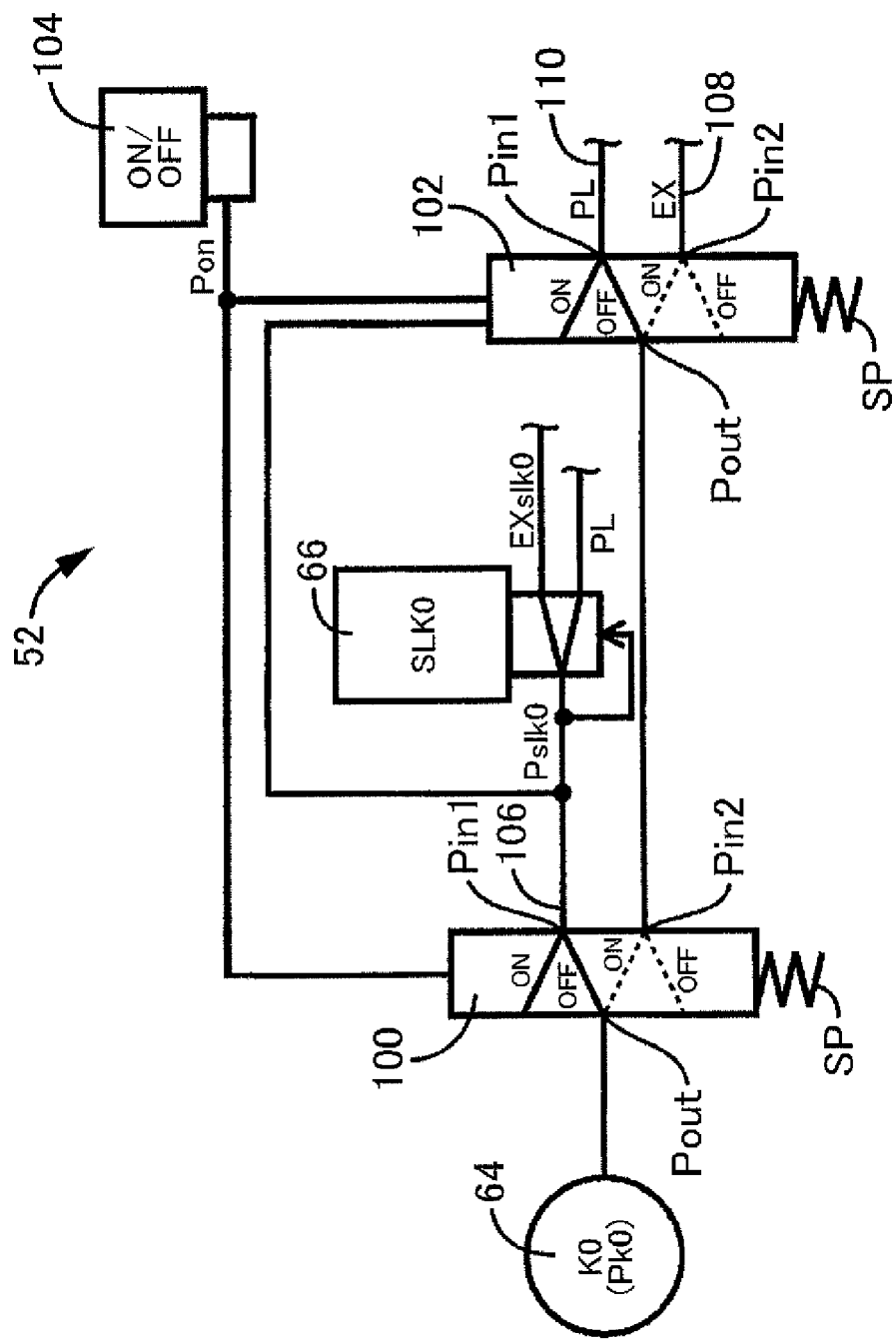
FIG. 12 is a view that shows another example embodiment of the K0 hydraulic control circuit.

A fourth embodiment of the invention will be described. FIG. 12 is a view that shows another example embodiment of the K0 hydraulic control circuit 52, and is an embodiment different from that of FIG. 11. Hereinafter, portions different from the embodiment of FIG. 11 will be mainly described.

In FIG. 12, in the K0 hydraulic control circuit 52 according to the present embodiment, the output port Pout of the second switching valve 102 is connected to the second input port Pin2 of the first switching valve 100. In the present embodiment, the SLK0 pressure Pslk0 is input to the first input port Pin1 of the first switching valve 100. In the present embodiment, the first port of the first switching valve is the output port Pout of the first switching valve 100, the second port of the first switching valve is the first input port Pin1 of the first switching valve 100, the third port of the first switching valve is the second input port Pin1 of the first switching valve 100, the first port of the second switching valve is the output port Pout of the second switching valve 102, and the second port or third port of the second switching valve is one of the first input port Pin1 and second input port Pin2 of the second switching valve 102. In the present embodiment, the first solenoid valve is the on-off solenoid valve 104, and the second solenoid valve is the solenoid valve 66. In the present embodiment, the SLK0 pressure Pslk0 is applied to the second switching valve 102 so that thrust is generated for switching the second switching valve 102 in the same direction (first direction) as the direction (first direction) of thrust that is generated by application of the switching hydraulic pressure Pon.

In the thus configured K0 hydraulic control circuit 52, when the SLK0 pressure Pslk0 does not satisfy the condition that the SLK0 pressure Pslk0 is lower than the predetermined value while no switching hydraulic pressure Pon is output, the first input port Pin1 is communicated with the output port Pout in each of the first and second switching valves 100, 102. Thus, the first oil path 106 is set. The first oil path 106 is an oil path that communicates the first input port Pin1 of the first switching valve 100, to which the SLK0 pressure Pslk0 is input, with the hydraulic actuator 64 via the output port Pout of the first switching valve 100, and is an oil path that supplies the SLK0 pressure Pslk0 to the hydraulic actuator 64 or releases the SLK0 pressure Pslk0 from the hydraulic actuator 64. When the switching hydraulic pressure Pon is output and the SLK0 pressure Pslk0 is higher than or equal to the predetermined value, the second switching valve 102 according to the present embodiment is switched to the on state where the second input port Pin2 is communicated with the output port Pout. Therefore, in the second switching valve 102 according to the present embodiment, when no switching hydraulic pressure Pon is output, the second switching valve 102 is switched to the off state where the first input port Pin1 is communicated with the output port Pout. Therefore, when no switching hydraulic pressure Pon is output, the requirement that the condition that the SLK0 pressure Pslk0 is lower than the predetermined value is not satisfied is not required. That is, in the K0 hydraulic control circuit 52 according to the present embodiment, when no switching hydraulic pressure Pon is output, the first input port Pin1 is communicated with the output port Pout in each of the first and second switching valves 100, 102 irrespective of the SLK0 pressure Pslk0. Thus, the first oil path 106 is set.

In the K0 hydraulic control circuit 52 according to the present embodiment, when the SLK0 pressure Pslk0 is higher than or equal to the switching valve switching threshold while the switching hydraulic pressure Pon is output, the second input port Pin2 is communicated with the output port Pout in each of the first and second switching valves 100, 102. Thus, the second oil path 108 is set. The second oil path 108 is an oil path that communicates the second input port Pin2 of the second switching valve 102 with the hydraulic actuator 64 sequentially via the output port Pout of the second switching valve 102, the second input port Pin2 of the first switching valve 100 and the output port Pout of the first switching valve 100. In the present embodiment, because the atmosphere exposure oil path EX is connected to the second input port Pin2 of the second switching valve 102, the second oil path 108 is an oil path that connects the atmosphere exposure oil path EX to the hydraulic actuator 64.

In the K0 hydraulic control circuit 52 according to the present embodiment, the first input port Pin1 is communicated with the output port Pout in the second switching valve 102 when the SLK0 pressure Pslk0 is lower than the switching valve switching threshold irrespective of whether the switching hydraulic pressure Pon is output, and the second input port Pin2 is communicated with the output port Pout in the first switching valve 100 depending on the fact that the switching hydraulic pressure Pon is output. Thus, the third oil path 110 is set. The third oil path 110 is an oil path that communicates the first input port Pin1 of the second switching valve 102 with the hydraulic actuator 64 sequentially via the output port Pout of the second switching valve 102, the second input port Pin2 of the first switching valve 100 and the output port Pout of the first switching valve 100. In the present embodiment, because the line pressure PL is input to the first input port Pin1 of the second switching valve 102, the third oil path 110 is an oil path that supplies the line pressure PL to the hydraulic actuator 64.

As described above, according to the present embodiment, as shown in FIG. 4, the hydraulic control circuit 50 (K0 hydraulic control circuit 52) is able to set three types of supply pressure (K0 clutch pressure Pk0) with the use of the single on-off solenoid valve 104 by switching the first and second switching valves 100, 102 in accordance with whether the SLK0 pressure Pslk0 is high or low (for, example, high or low with respect to the switching valve switching threshold). Thus, similar advantageous effects to those of the above-described third embodiment are obtained.

According to the present embodiment, when the predetermined switching hydraulic pressure Pon is output, the control hydraulic pressure Pslk0 of the solenoid valve 66 is lower than the predetermined switching valve switching threshold and the control hydraulic pressure Pslk0 of the solenoid valve 66 is applied in the first direction to switch the second switching valve 102, the second input port Pin2 of the first switching valve 100 is communicated with the output port Pout of the second switching valve 102, and the first input port Pin1 of the second switching valve 102 is communicated with the output port Pout of the second switching valve 102. Thus, the third oil path 110 is set. As a result, it is possible to alternatively switch among the three oil paths with the use of the single on-off solenoid valve 104 common to the two switching valves.

Figure 13:
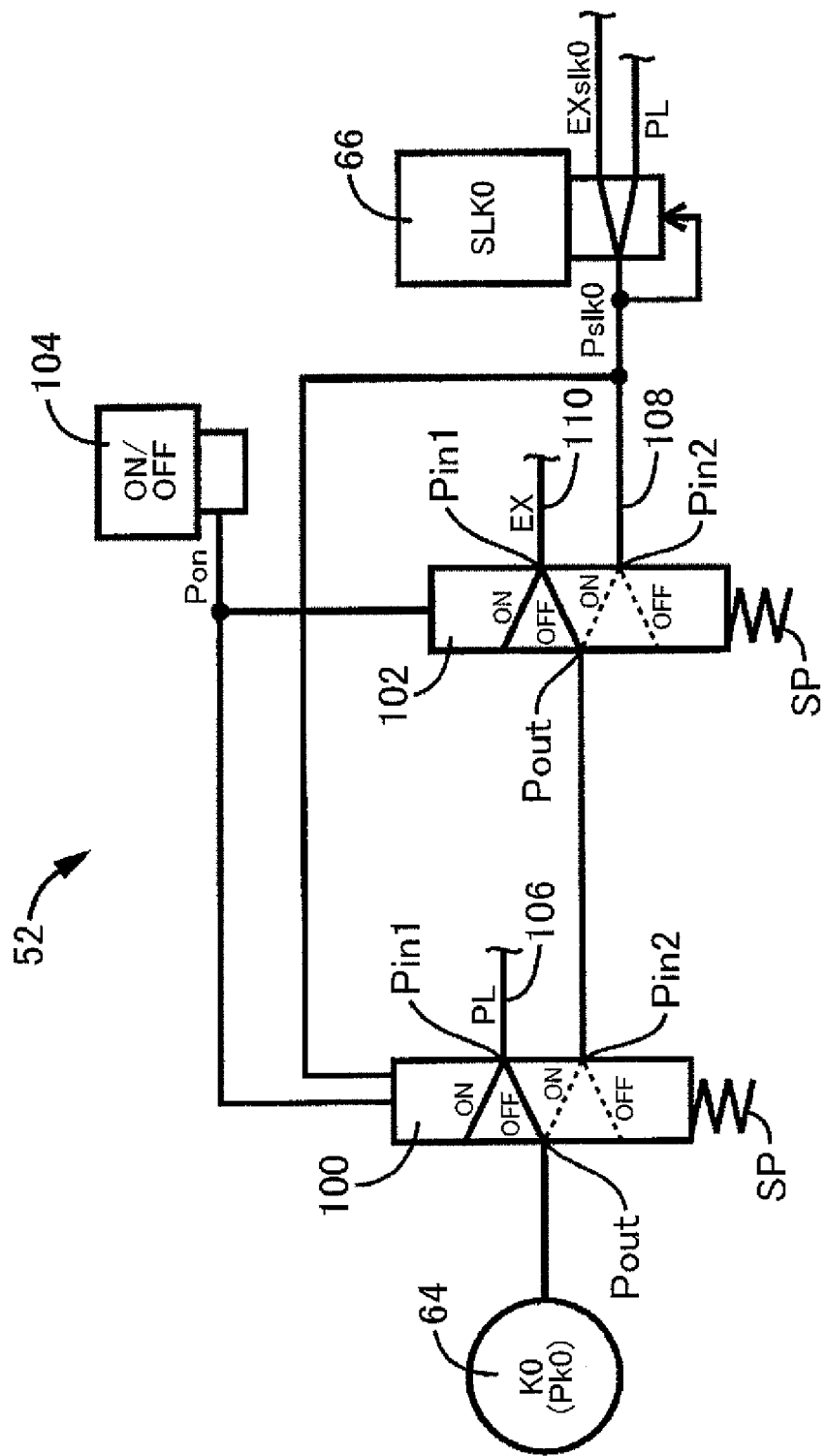
FIG. 13 is a view that shows another example embodiment of the K0 hydraulic control circuit.

A fifth embodiment of the invention will be described. FIG. 13 is a view that shows another example embodiment of the K0 hydraulic control circuit 52, and is an embodiment different from that of FIG. 3. Hereinafter, portions different from the embodiment of FIG. 3 will be mainly described.

In FIG. 13, in the K0 hydraulic control circuit 52 according to the present embodiment, the output port Pout of the second switching valve 102 is connected to the second input port Pin2 of the first switching valve 100. In the present embodiment, the SLK0 pressure Pslk0 is input to the second input port Pin2 of the second switching valve 102. In the present embodiment, the first port of the first switching valve is the output port Pout of the first switching valve 100, the second port of the first switching valve is the second input port Pin2 of the first switching valve 100, the third port of the first switching valve is the first input port Pin1 of the first switching valve 100, the first port of the second switching valve is the output port Pout of the second switching valve 102, and the second port or third port of the second switching valve is one of the first input port Pin1 and second input port Pin2 of the second switching valve 102. In the present embodiment, the first solenoid valve is the on-off solenoid valve 104, and the second solenoid valve is the solenoid valve 66. The SLK0 pressure Pslk0 is applied to the other switching valve so that thrust is generated for switching the other switching valve in the same direction (first direction) as the direction (first direction) of thrust that is generated by application of the switching hydraulic pressure Pon. In the present embodiment, the SLK0 pressure Pslk0 is applied to the first switching valve 100 so that thrust is generated for switching the first switching valve 100 in the same direction (first direction) as the direction (first direction) of thrust that is generated by application of the switching hydraulic pressure Pon.

In the thus configured K0 hydraulic control circuit 52, when the SLK0 pressure Pslk0 does not satisfy the predetermined condition while no switching hydraulic pressure Pon is output, the first input port Pint is communicated with the output port Pout in each of the first and second switching valves 100, 102. Thus, the first oil path 106 is set. The first oil path 106 is an oil path that communicates the first input port Pin1 of the first switching valve 100 with the hydraulic actuator 64 via the output port Pout of the first switching valve 100. In the present embodiment, because the line pressure PL is input to the first input port Pin1 of the first switching valve 100, the first oil path 106 is an oil path that supplies the line pressure PL to the hydraulic actuator 64.

The predetermined condition is a condition that the SLK0 pressure Pslk0 is higher than or equal to a predetermined value. When the switching hydraulic pressure Pon is output or when the SLK0 pressure Pslk0 is higher than or equal to the predetermined value, the first switching valve 100 according to the present embodiment is switched to the on state where the second input port Pin2 is communicated with the output port Pout. Therefore, to set the first oil path 106, the requirement that the SLK0 pressure Pslk0 does not satisfy the predetermined condition while no switching hydraulic pressure Pon is output is required.

In the K0 hydraulic control circuit 52, when the SLK0 pressure Pslk0 does not satisfy the predetermined condition while the switching hydraulic pressure Pon is output (for example, when the SLK0 pressure Pslk0 is lower than the switching valve switching threshold), the second input port Pin2 is communicated with the output port Pout in each of the first and second switching valves 100, 102. Thus, the second oil path 108 is set. The second oil path 108 is an oil path that communicates the second input port Pin2 of the second switching valve 102, to which the SLK0 pressure Pslk0 is input, with the hydraulic actuator 64 sequentially via the output port Pout of the second switching valve 102, the second input port Pin2 of the first switching valve 100 and the output port Pout of the first switching valve 100, and is an oil path that supplies the SLK0 pressure Pslk0 to the hydraulic actuator 64 or releases the SLK0 pressure Pslk0 from the hydraulic actuator 64. When the witching hydraulic pressure Pon is output, the first switching valve 100 according to the present embodiment is switched to the on state where the second input port Pin2 is communicated with the output port Pout. Therefore, when the switching hydraulic pressure Pon is output, the requirement that the SLK0 pressure Pslk0 does not satisfy the predetermined condition is not required. That is, in the K0 hydraulic control circuit 52 according to the present embodiment, when the switching hydraulic pressure Pon is output, the second input port Pin2 is communicated with the output port Pout in each of the first and second switching valves 100, 102 irrespective of the SLK0 pressure Pslk0. Thus, the second oil path 108 is set.

In the K0 hydraulic control circuit 52 according to the present embodiment, the second input port Pin2 is communicated with the output port Pout in the first switching valve 100 when the SLK0 pressure Pslk0 is higher than or equal to the switching valve switching threshold irrespective of whether the switching hydraulic pressure Pon is output, and the first input port Pin1 is communicated with the output port Pout in the second switching valve 102 depending on the fact that no switching hydraulic pressure Pon is output. Thus, the third oil path 110 is set. The third oil path 110 is an oil path that communicates the first input port Pin1 of the second switching valve 102 with the hydraulic actuator 64 sequentially via the output port Pout of the second switching valve 102, the second input port Pin2 of the first switching valve 100 and the output port Pout of the first switching valve 100. In the present embodiment, because the atmosphere exposure oil path EX is connected to the first input port Pin1 of the second switching valve 102, the third oil path 110 is an oil path that connects the atmosphere exposure oil path EX to the hydraulic actuator 64.

As described above, according to the present embodiment, as shown in FIG. 14, the hydraulic control circuit 50 (K0 hydraulic control circuit 52) is able to set three types of supply pressure (K0 clutch pressure Pk0) with the use of the single on-off solenoid valve 104 by switching the first and second switching valves 100, 102 in accordance with whether the SLK0 pressure Pslk0 is high or low (for example, high or low with respect to the switching valve switching threshold). Thus, similar advantageous effects to those of the above-described first embodiment, are obtained. In FIG. 14, the correlation between whether the switching hydraulic pressure Pon is output and the oil path to be set is opposite to that of FIG. 4.

According to the present embodiment, when no predetermined switching hydraulic pressure Pon is output, the control hydraulic pressure Pslk0 of the solenoid valve 66 is higher than or equal to the predetermined switching valve switching threshold and the control hydraulic pressure Pslk0 of the solenoid valve 66 is applied in the first direction to switch the first switching valve 100, the second input port Pin2 of the first switching, valve 100 is communicated with the output port Pout of the second switching valve 102, and the first input port Pin1 of the second switching valve 102 is communicated with the output port Pout of the second switching valve 102. Thus, the third oil path 110 is set. As a result, it is possible to alternatively switch among the three oil paths with the use of the single on-off solenoid valve 104 common to the two switching valves.

Figure 15:
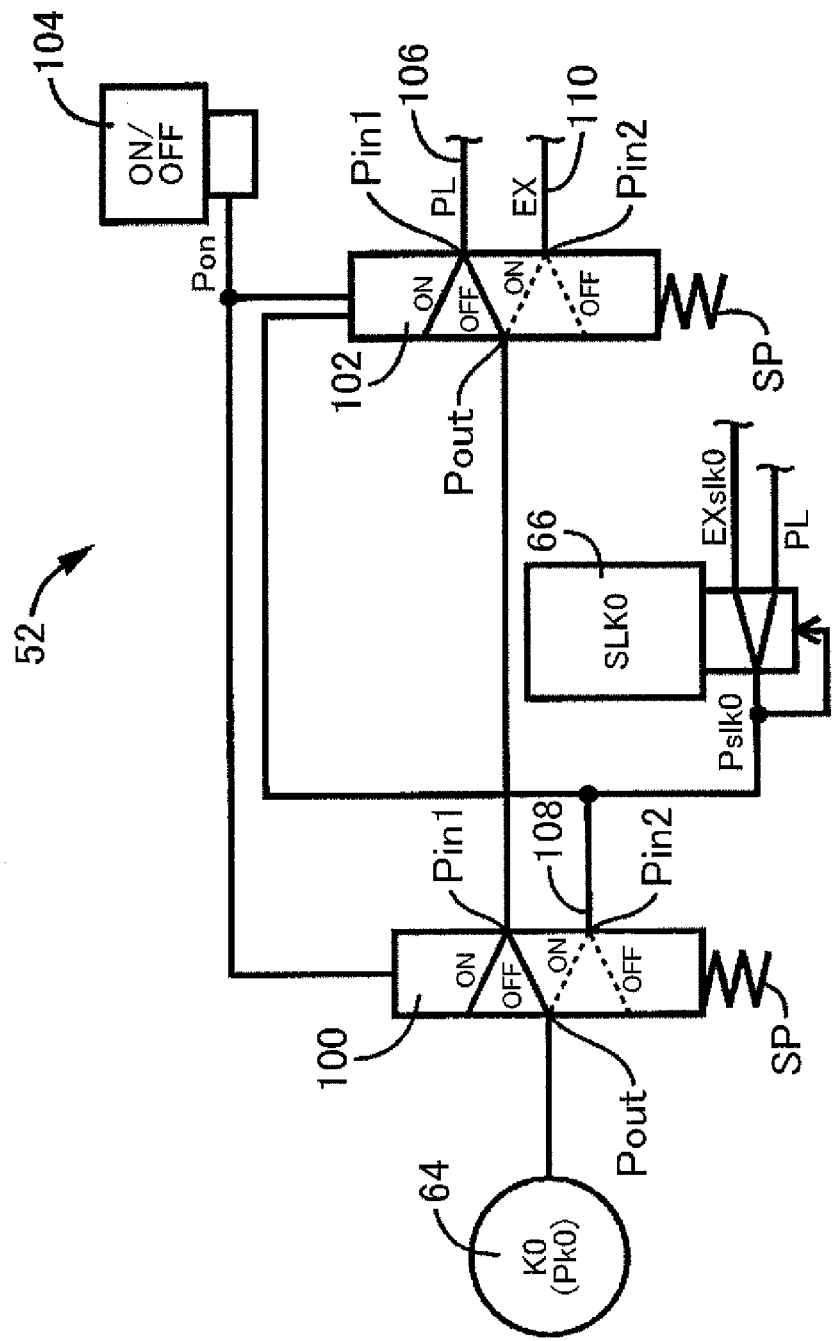
FIG. 15 is a view that shows another example embodiment of the K0 hydraulic control circuit.

A sixth embodiment of the invention will be described. FIG. 15 is a view that shows another example embodiment of the K0 hydraulic control circuit 52, and is an embodiment different from that of FIG. 13. Hereinafter, portions different from the embodiment of FIG. 13 will be mainly described.

In FIG. 15, in the K0 hydraulic control circuit 52 according to the present embodiment, the output port Pout of the second switching valve 102 is connected to the first input port Pin1 of the first switching valve 100. In the present embodiment, the SLK0 pressure Pslk0 is input to the second input port Pin2 of the first switching valve 100. In the present embodiment, the first port of the first switching valve is the output port Pout of the first switching valve 100, the second port of the first switching valve is the second input port Pin2 of the first switching valve 100, the third port of the first switching valve is the first input port Pin1 of the first switching valve 100, the first port of the second switching valve is the output port Pout of the second switching valve 102, and the second port or third port of the second switching valve is one of the first input port Pin1 and second input port Pin2 of the second switching valve 102. In the present embodiment, the first solenoid valve is the on-off solenoid valve 104, and the second solenoid valve is the solenoid valve 66. In the present embodiment, the SLK0 pressure Pslk0 is applied to the second switching valve 102 so that thrust is generated for switching the second switching valve 102 in the same direction (first direction) as the direction (first direction) of thrust that is generated by application of the switching hydraulic pressure Pon.

In the thus configured K0 hydraulic control circuit 52 according to the present embodiment, when the SLK0 pressure Pslk0 does not satisfy the condition that the SLK0 pressure Pslk0 is higher than or equal to the predetermined value while no switching hydraulic pressure Pon is output, the first input port Pin1 is communicated with the output port Pout in each of the first and second switching valves 100, 102. Thus, the first oil path 106 is set. The first oil path 106 is an oil path that communicates the first input port Pin1 of the second switching valve 102 with the hydraulic actuator 64 sequentially via the output port Pout of the second switching valve 102, the first input port Pin1 of the first switching valve 100 and the output port Pout of the first switching valve 100. In the present embodiment, because the line pressure PL is input to the first input port Pin1 of the second switching valve 102, the first oil path 106 is an oil path that supplies the line pressure PL to the hydraulic actuator 64. When the switching hydraulic pressure Pon is output or when the SLK0 pressure Pslk0 is higher than or equal to the predetermined value, the second switching valve 102 according to the present embodiment is switched to the on state where the second input port Pin2 is communicated with the output port Pout. Therefore, to set the first oil path 106, the requirement that the condition that the SLK0 pressure Pslk0 is higher than or equal to the predetermined value is not satisfied while no switching hydraulic pressure Pon is output is required.

In the K0 hydraulic control circuit 52 according to the present embodiment, when the SLK0 pressure Pslk0 is lower than the switching valve switching threshold while the switching hydraulic pressure Pon is output, the second input port Pin2 is communicated with the output port Pout in each of the first and second switching valves 100, 102. Thus, the second oil path 108 is set. The second oil path 108 is an oil path that communicates the second input port Pin2 of the first switching valve 100, to which the SLK0 pressure Pslk0 is input, with the hydraulic actuator 64 via the output port Pout of the first switching valve 100, and is an oil path that, supplies the SLK0 pressure Pslk0 to the hydraulic actuator 64 or releases the SLK0 pressure Pslk0 from the hydraulic actuator 64. When the switching hydraulic pressure Pon is output, the second switching valve 102 according to the present embodiment is switched to the on state where the second input port Pin2 is communicated with the output port Pout. Therefore, when the switching hydraulic pressure Pon is output, the requirement that the condition that the SLK0 pressure Pslk0 is higher than or equal to the predetermined value is not satisfied is not required. That is in the K0 hydraulic control circuit 52 according to the present embodiment, when the switching hydraulic pressure Pon is output, the second input port Pin2 is communicated with the output port Pout in each of the first and second switching valves 100, 102 irrespective of the SLK0 pressure Pslk0. Thus, the second oil path 108 is set.

In the K0 hydraulic control circuit 52 according to the present embodiment, the second input port Pin2 is communicated with the output port Pout in the second switching valve 102 when the SLK0 pressure Pslk0 is higher than or equal to the switching valve switching threshold irrespective of whether the switching hydraulic pressure Pon is output, and the first input port Pin1 is communicated with the output port Pout in the first switching valve 100 depending on the fact that no switching hydraulic pressure Pon is output. Thus, the third oil path 110 is set. The third oil path 110 is an oil path that communicates the second input port Pin2 of the second switching valve 102 with the hydraulic actuator 64 sequentially via the output port Pout of the second switching valve 102, the first input port Pin1 of the first switching valve 100 and the output port Pout of the first switching valve 100. In the present embodiment, because the atmosphere exposure oil path EX is connected to the second input port Pin2 of the second switching valve 102, the third oil path 110 is an oil path that connects the atmosphere exposure oil path EX to the hydraulic actuator 64.

As described above, according to the present embodiment, as shown in FIG. 14, the hydraulic control circuit 50 (K0 hydraulic control circuit 52) is able to set three types of supply pressure (K0 clutch pressure Pk0) with the use of the single on-off solenoid valve 104 by switching the first and second switching valves 100, 102 in accordance with whether the SLK0 pressure Pslk0 is high or low (for example, high or low with respect to the switching valve switching threshold). Thus, similar advantageous effects to those of the above-described fifth embodiment are obtained.

According to the present embodiment, when no predetermined switching hydraulic pressure Pon is output, the control hydraulic pressure Pslk0 of the solenoid valve 66 is higher than or equal to the predetermined switching valve switching threshold and the control hydraulic pressure Pslk0 of the solenoid valve 66 is applied in the first direction to switch the second switching valve 102, the first input port Pin1 of the first switching valve 100 is communicated with the output port Pout of the second switching valve 102, and the second input port Pin2 of the second switching valve 102 is communicated with the output port Pout of the second switching valve 102. Thus, the third oil path 110 is set. As a result, it is possible to alternatively switch among the three oil paths with the use of the single on-off solenoid valve 104 common to the two switching valves.

Figure 16:
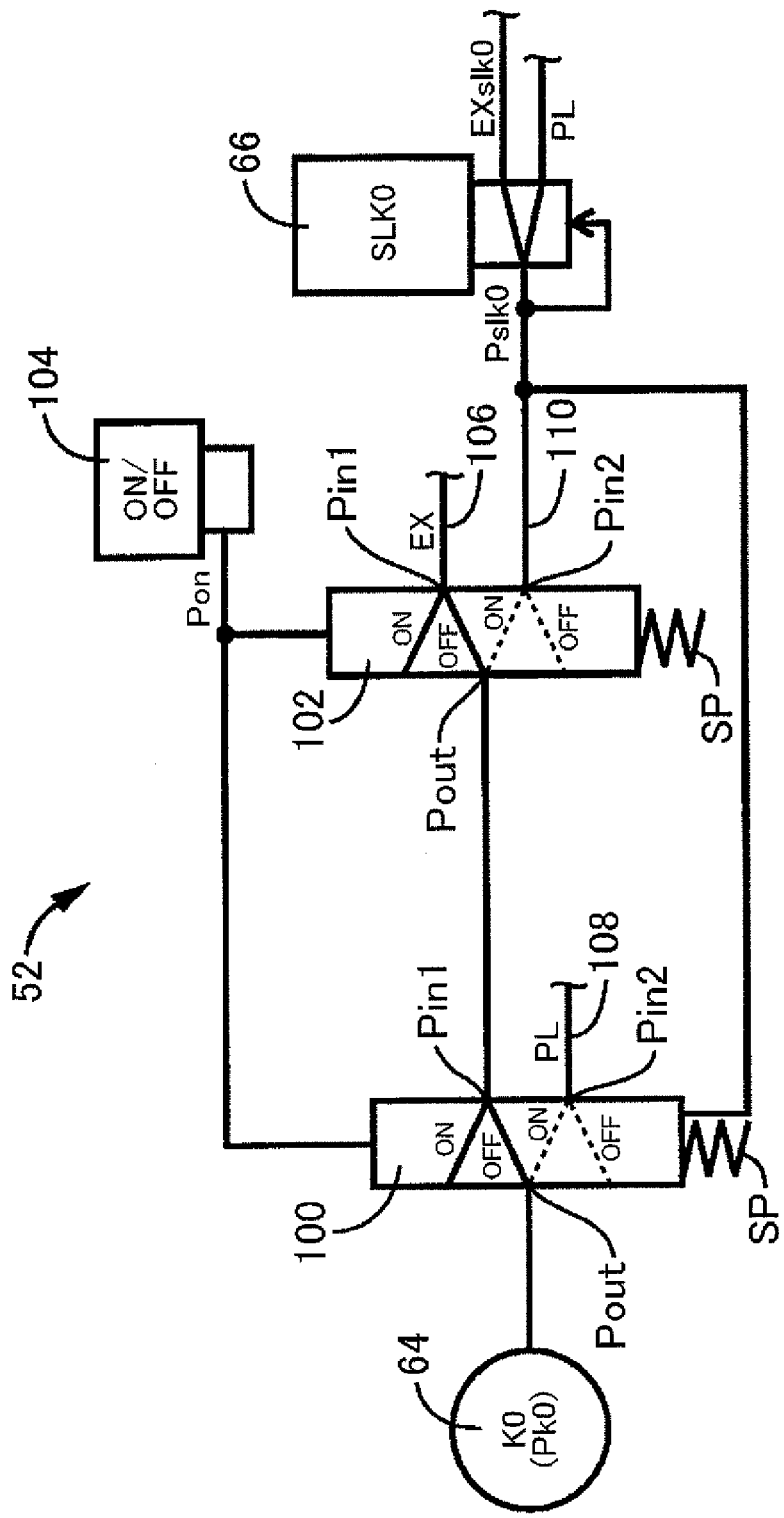
FIG. 16 is a view that shows another example embodiment of the K0 hydraulic control circuit.

A seventh embodiment of the invention will be described. FIG. 16 is a view that shows another example embodiment of the K0 hydraulic control circuit 52, and is an embodiment different from that of FIG. 3. Hereinafter, portions different from the embodiment of FIG. 3 will be mainly described.

In FIG. 16, the K0 hydraulic control circuit 52 according to the present embodiment differs from that of the embodiment of FIG. 3 in that the SLK0 pressure Pslk0 is input to the second input port Pin2 of the second switching valve 102, and the atmosphere exposure oil path EX is connected to the first input port Pin1 of the second switching valve 102. The first input port Pin1 of the second switching valve 102 is one of the first and second input ports Pin1, Pin2 of the second switching valve 102, to which the SLK0 pressure Pslk0 is not input. That is, the K0 hydraulic control circuit 52 according to the present embodiment differs from that of the embodiment of FIG. 3 in that input of the SLK0 pressure Pslk0 and connection of the atmosphere exposure oil path EX to the first and second input ports Pin1, Pin2 of the second switching valve 102 are interchanged. Thus, as shown in FIG. 17, the correlation between whether the switching hydraulic pressure Pon is output and the oil path to be set is different from that of FIG. 4. That is, in FIG. 17, the SLK0 pressure Pslk0 and the atmosphere exposure oil path EX in FIG. 4 are interchanged. In the K0 hydraulic control circuit 52 according to the present embodiment, when the SLK0 pressure Pslk0 is reduced below the switching valve switching threshold during normal operation of the solenoid valve 66, there is a possibility that the atmosphere exposure oil path EX is switched into the oil path that supplies the line pressure PL. Therefore, during normal operation of the solenoid valve 66, a minimum hydraulic pressure to such an extent that the atmosphere exposure oil path EX is not switched into the oil path that supplies the line pressure PL (for example, a hydraulic pressure higher than or equal to the switching valve switching threshold or a value obtained by adding a margin to the switching valve switching threshold) is output. For example, the characteristic of the return spring, or the like, is set so that the clutch K0 is released at the minimum hydraulic pressure. In the present embodiment, the first port of the first switching valve is the output port Pout of the first switching valve 100, the second port of the first switching valve is the first input port Pin1 of the first switching valve 100, the third port of the first switching valve is the second input port Pin2 of the first switching valve 100, the first port of the second switching valve is the output port Pout of the second switching valve 102, and the second port or third port of the second switching valve is one of the first input port Pin1 and second input port Pin2 of the second switching valve 102. In the present embodiment, the first solenoid valve is the on-off solenoid valve 104, and the second solenoid valve is the solenoid valve 66.

As described above, according to the present embodiment, as shown in FIG. 17, the hydraulic control circuit 50 (K0 hydraulic control circuit 52) is able to set three types of supply pressure (K0 clutch pressure Pk0) with the use of the single on-off solenoid valve 104 by switching the first and second switching valves 100, 102 in accordance with whether the SLK0 pressure Pslk0 is high or low (for example, high or low with respect to the switching valve switching threshold). Thus, similar advantageous effects to those of the above-described first embodiment are obtained.

According to the present embodiment, when the predetermined switching hydraulic pressure Pon is output, the control hydraulic pressure Pslk0 of the solenoid valve 66 is higher than or equal to the predetermined switching valve switching threshold and the control hydraulic pressure Pslk0 of the solenoid valve 66 is applied in the second direction to switch the first switching valve 100, the first input port Pin1 of the first switching valve 100 is communicated with the output port Pout of the second switching valve 102 and the second input port Pin2 of the second switching valve 102 is communicated with the output port Pout of the second switching valve 102. Thus, the third oil path 110 is set. As a result, it is possible to alternatively switch among the three oil paths with the use of the single on-off solenoid valve 104 common to the two switching valves.

The embodiments of the invention are described in detail with reference to the accompanying drawings; however, the invention is also applicable to other embodiments.

For example, in the above-described embodiments, the drive line 12 is provided in the vehicle 10 that is the hybrid vehicle; however, the invention is not limited to this configuration. For example, a drive line may constitute a power transmission path from a single driving force source to a drive wheel. The hydraulic control circuit 50 (K0 hydraulic control circuit 52) that alternatively switches among the three oil paths to the clutch K0 that connects the engine 14 to the power transmission path or disconnects the engine 14 from the power transmission path is illustrated; however, the invention is not limited to this configuration. For example, a hydraulic control circuit may alternatively switch among three oil paths to an engagement device that connects or interrupts a-power transmission path. For such an engagement device, at a low temperature of hydraulic oil where drain of hydraulic oil delays, it is useful to quickly drain hydraulic oil through the atmosphere exposure oil path EX. The automatic transmission 20, the torque converter 18, or the like, does not necessarily need to be provided in the drive line 12. In short, as long as a drive line includes a hydraulic actuator that is alternatively communicated with three oil paths, the invention is applicable.

In the embodiment of FIG. 13 according to the above-described fifth embodiment, as well as the embodiment of FIG. 16 according to the above-described seventh embodiment, an embodiment in which input of the SLK0 pressure Pslk0 and connection of the atmosphere exposure oil path EX to the first and second input ports Pin1, Pin2 of the second switching valve 102 are interchanged is applicable. The solenoid valve 66 or the on-off solenoid valve 104 may be a normally-open or N/O valve. In this way, each of the embodiments described in the first to seventh embodiments may be modified as needed within the scope of the invention.

In the above-described embodiments, the SLK0 pressure Pslk0 is applied to the other switching valve so that thrust for switching the other switching valve is generated. Instead, the SLK0 pressure Pslk0 may be applied to the one of the switching valves so that the thrust is generated or the SLK0 pressure Pslk0 may be applied to both the switching valves so that the thrust is generated.

In the above-described embodiments, the on-off solenoid valve 104 is used. Instead, a valve that is able to switch a switching valve is applicable, and another valve, such as a linear solenoid valve, may be used.

In the above-described embodiments, determination as to off-fail of the solenoid valve 66 and determination as to a decrease in the SLK0 pressure Pslk0 may be carried out by providing a hydraulic pressure sensor and carrying out a determination on the basis of a detected value of the hydraulic pressure sensor, or the like. In this way, various methods are applicable.

The above-described embodiments are only illustrative, and the invention may be implemented in modes including various modifications and improvements on the basis of the knowledge of persons skilled in the art.

What is claimed is:

1. A hydraulic control circuit for a drive line, the hydraulic control circuit comprising:
a first switching valve configured to be alternatively switched by a switching hydraulic pressure so as to alternatively connect a first port and a second port, or the first port and a third port, the first port of the first switching valve being connected to a hydraulic actuator;
a second switching valve configured to be alternatively switched by the switching hydraulic pressure so as to alternatively connect a first port and a second port, or the first port and a third port, the first port of the second switching valve being connected to the second port of the first switching valve;
a first solenoid valve provided in parallel connection to the first switching valve and the second switching valve, the first solenoid valve being configured to supply the switching hydraulic pressure to the first switching valve and the second switching valve; and
a second solenoid valve configured to regulate a hydraulic pressure as a control hydraulic pressure, the hydraulic pressure being supplied to the hydraulic actuator, any one of three oil paths operably communicating hydraulic pressure with the hydraulic actuator by supplying the control hydraulic pressure from the second solenoid valve to the hydraulic actuator via any one of the third port of the first switching valve the second port of the second switching valve and the third port of the second switching valve and supplying the switching hydraulic pressure from the first solenoid valve to at least one of the first switching valve or the second switching valve.

2. The hydraulic control circuit according to claim 1, wherein
the three oil paths include a first oil path, a second oil path and a third oil path,
when a predetermined switching hydraulic pressure is not output and the control hydraulic pressure does not satisfy a predetermined condition, the first oil path is set by communicating the first port of the first switching valve and the second port of the first switching valve, the first port of the second switching valve and the second port of the second switching valve, and the hydraulic actuator with one another,
when the predetermined switching hydraulic pressure is output and the control hydraulic pressure does not satisfy the predetermined condition, the second oil path is set by communicating the first port of the first switching valve and the third port of the first switching valve with the hydraulic actuator, and
when the predetermined switching hydraulic pressure is output and the control hydraulic pressure satisfies the predetermined condition, the third oil path is set by communicating the first port of the first switching valve and the second port of the first switching valve, the first port of the second switching valve and the third port of the second switching valve, and the hydraulic actuator with one another.

3. The hydraulic control circuit according to claim 2, wherein
the predetermined condition is a condition that the control hydraulic pressure is higher than or equal to a predetermined value.

4. The hydraulic control circuit according to claim 2, wherein
the predetermined condition is a condition that the control hydraulic pressure is lower than a predetermined value.

5. The hydraulic control circuit according to claim 1, wherein
the three oil paths include a first oil path, a second oil path and a third oil path,
when a predetermined switching hydraulic pressure is output and the control hydraulic pressure does not satisfy a predetermined condition, the first oil path is set by communicating the first port of the first switching valve and the second port of the first switching valve, the first port of the second switching valve and the second port of the second switching valve, and the hydraulic actuator with one another,
when the predetermined switching hydraulic pressure is not output and the control hydraulic pressure does not satisfy the predetermined condition, the second oil path is set by communicating the first port of the first switching valve and the third port of the first switching valve with the hydraulic actuator, and
when the predetermined switching hydraulic pressure is output and the control hydraulic pressure satisfies the predetermined condition, the third oil path is set by communicating the first port of the first switching valve and the second port of the first switching valve, the first port of the second switching valve and the third port of the second switching valve, and the hydraulic actuator with one another.

6. The hydraulic control circuit according to claim 5, wherein
the predetermined condition is a condition that the control hydraulic pressure is higher than or equal to a predetermined value.

7. The hydraulic control circuit according to claim 5, wherein
the predetermined condition is a condition that the control hydraulic pressure is lower than a predetermined value.

8. The hydraulic control circuit according to claim 1, wherein
the three oil paths include an oil path that supplies a source pressure to hydraulic oil for actuating the hydraulic actuator, an oil path that supplies the control hydraulic pressure, and an oil path that communicates with a port exposed to an atmosphere.

9. The hydraulic control circuit according to claim 1, wherein
a source pressure of a hydraulic oil is input to the third port of the first switching valve, and an atmosphere exposure oil path is connected to one of the second port of the second, switching valve and the third port of the second switching valve, to which the control hydraulic pressure is not input.

* * * * *